US012265225B2

(12) United States Patent
Nakamura et al.

(10) Patent No.: US 12,265,225 B2
(45) Date of Patent: Apr. 1, 2025

(54) LIGHT GUIDE MEMBER AND DISPLAY DEVICE

(71) Applicants: Naoki Nakamura, Saitama (JP); Masahiro Itoh, Kanagawa (JP); Susumu Momma, Kanagawa (JP); Shigenobu Hirano, Kanagawa (JP); Yoshifumi Sudoh, Kanagawa (JP); Shun Okazaki, Tokyo (JP); Yasuo Katano, Kanagawa (JP); Kenji Kameyama, Kanagawa (JP); Norikazu Igarashi, Kanagawa (JP); Masamichi Yamada, Kanagawa (JP); Aino Hasegawa, Kanagawa (JP); Takashi Maki, Kanagawa (JP)

(72) Inventors: Naoki Nakamura, Saitama (JP); Masahiro Itoh, Kanagawa (JP); Susumu Momma, Kanagawa (JP); Shigenobu Hirano, Kanagawa (JP); Yoshifumi Sudoh, Kanagawa (JP); Shun Okazaki, Tokyo (JP); Yasuo Katano, Kanagawa (JP); Kenji Kameyama, Kanagawa (JP); Norikazu Igarashi, Kanagawa (JP); Masamichi Yamada, Kanagawa (JP); Aino Hasegawa, Kanagawa (JP); Takashi Maki, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 233 days.

(21) Appl. No.: 18/008,183

(22) PCT Filed: Jun. 9, 2021

(86) PCT No.: PCT/IB2021/055053
§ 371 (c)(1),
(2) Date: Dec. 5, 2022

(87) PCT Pub. No.: WO2022/018534
PCT Pub. Date: Jan. 27, 2022

(65) Prior Publication Data
US 2023/0280592 A1    Sep. 7, 2023

(30) Foreign Application Priority Data

Jul. 21, 2020 (JP) .................................. 2020-124168
Jul. 28, 2020 (JP) .................................. 2020-127360

(51) Int. Cl.
*G02B 27/01* (2006.01)
*F21V 8/00* (2006.01)

(52) U.S. Cl.
CPC ....... *G02B 27/0172* (2013.01); *G02B 6/0018* (2013.01); *G02B 2027/0118* (2013.01); *G02B 2027/0123* (2013.01)

(58) Field of Classification Search
None
See application file for complete search history.

(56) References Cited

U.S. PATENT DOCUMENTS 8,189,263 B1   5/2012   Wang et al.
8,666,208 B1   3/2014   Amirparviz
(Continued)

FOREIGN PATENT DOCUMENTS

CN   107783293 A    3/2018
JP   2012-198260    10/2012
(Continued)

OTHER PUBLICATIONS

Office Action issued Dec. 5, 2023 in Japanese Patent Application No. 2020-124168, 10 pages.
(Continued)

*Primary Examiner* — Jerry Rahll
(74) *Attorney, Agent, or Firm* — XSENSUS LLP

(57) ABSTRACT

A light guide member (300) includes a boundary surface (304) configured to reflect image light guided to the boundary surface (304) and emit the image light outside the light guide member (300), an opposing surface (306) parallel to the boundary surface (304), the opposing surface (306) facing the boundary surface (304), a first inclined surface (305) having an inclination in which a distance between the first inclined surface (305) and the boundary surface (304) decreases in a guiding direction of the image light, and a second inclined surface (307) between the opposing surface (306) and the first inclined surface (305), the second inclined
(Continued)

surface (307) inclined at a different angle with the first inclined surface (305) in the guiding direction.

19 Claims, 22 Drawing Sheets

(56) References Cited

U.S. PATENT DOCUMENTS

| | | | |
|---|---|---|---|
| 10,241,333 B2* | 3/2019 | Nakamura | G02B 6/0038 |
| 2010/0260455 A1 | 10/2010 | Pascal et al. | |
| 2017/0090094 A1* | 3/2017 | Ohsugi | G02B 6/003 |
| 2017/0184855 A1* | 6/2017 | Takagi | G02B 6/002 |
| 2017/0192239 A1 | 7/2017 | Nakamura et al. | |
| 2019/0004235 A1 | 1/2019 | Ohsugi et al. | |
| 2019/0353908 A1 | 11/2019 | Igarashi et al. | |
| 2020/0400962 A1 | 12/2020 | Hirano et al. | |

FOREIGN PATENT DOCUMENTS

| | | |
|---|---|---|
| JP | 2013-210633 | 10/2013 |
| JP | 2017-120305 | 7/2017 |
| JP | 2017-122771 | 7/2017 |
| JP | 2018-054976 A | 4/2018 |
| JP | 2018-165740 A | 10/2018 |
| JP | 2019-204123 | 11/2019 |
| WO | WO2009/074638 A2 | 6/2009 |

OTHER PUBLICATIONS

International Search Report issued on Aug. 31, 2021 in PCT/IB2021/055053 filed on Jun. 9, 2021, 15 pages.

* cited by examiner

COMPARATIVE EXAMPLE

COMPARATIVE EXAMPLE

COMPARATIVE EXAMPLE

COMPARATIVE EXAMPLE

LIGHT GUIDE MEMBER AND DISPLAY DEVICE

CROSS-REFERENCE TO RELATED APPLICATION

This application is a national stage (under 35 U.S.C. 371) of International Patent Application No. PCT/IB2021/055053, filed Jun. 9, 2021, claiming priority to Japanese Patent Application No. 2020-124168, filed Jul. 21, 2020, and Japanese Patent Application No. 2020-127360, filed Jul. 28, 2020, both of which are herein incorporated by reference in their entirety.

TECHNICAL FIELD

Aspect of the preset disclosure relates to a light guide member and a display device.

BACKGROUND ART

Patent literature (PTL 1) discloses a light guide plate that includes a light incident part, a light guide part, and a light emission part. The light incident part takes in image light inside the light guide plate. The light guide part includes a first total reflection surface and a second total reflection surface extending to face each other. The light guide part guides the image light taken in from the light incident part by total reflection of the first total reflection surface and the second total reflection surface. The light emission part includes an image extraction part extractable the image light incident on the light guide plate via the light guide part outside the light guide plate by bending a light path. The image extraction part includes a plurality of first element surfaces and a plurality of second element surfaces arranged alternately. The first element surface extends to be inclined toward an interior of the light guide part at back side of the light guide part in a light guide direction of the light guide part with reference to the second total reflection surface to reflect the image light guided by the light guide part. The second element surface extends to be inclined to form an obtuse angle with respect to the first element surface.

CITATION LIST

Patent Literature

[PTL 1]
Japanese Patent No. 5703875

SUMMARY OF INVENTION

Technical Problem

An object of the present embodiment is to provide a light guide member and a display device that reduce stray light while achieving a wide viewing angle.

Solution to Problem

A light guide member includes a boundary surface configured to reflect image light guided to the boundary surface and emit the image light outside the light guide member, an opposing surface parallel to the boundary surface, the opposing surface facing the boundary surface, a first inclined surface having an inclination in which a distance between the first inclined surface and the boundary surface decreases in a guiding direction of the image light, and a second inclined surface between the opposing surface and the first inclined surface, the second inclined surface inclined at a different angle with the first inclined surface in the guiding direction.

Advantageous Effects of Invention

According to the present embodiment, it is possible to provide a light guide member and a display device that reduce stray light while achieving a wide viewing angle.

BRIEF DESCRIPTION OF DRAWINGS

The accompanying drawings are intended to depict example embodiments of the present invention and should not be interpreted to limit the scope thereof. The accompanying drawings are not to be considered as drawn to scale unless explicitly noted. Also, identical or similar reference numerals designate identical or similar components throughout the several views.

DESCRIPTION OF EMBODIMENTS

Figure 1:
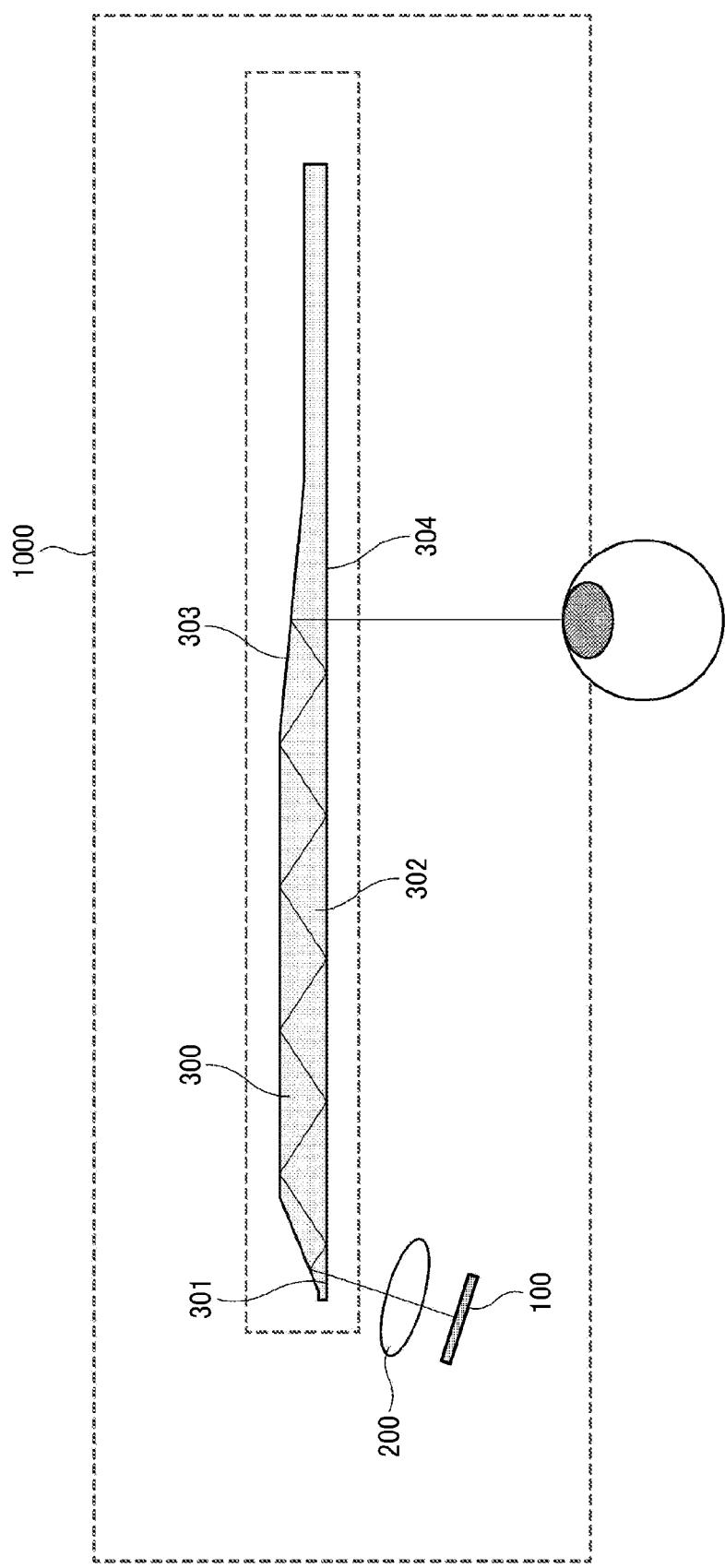
FIG. 1 illustrates an example of a light guide member and a virtual image display device using the light guide member according to an embodiment of the present disclosure.

The terminology used herein is for the purpose of describing particular embodiments only and is not intended to be limiting of the present invention. As used herein, the singular forms "a", "an", and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

FIG. 1 illustrates an example of a light guide member 300 and a virtual image display device 1000 using the light guide member 300 according to an embodiment of the present disclosure.

The virtual image display device 1000 is an example of a display device. The virtual image display device 1000 includes an image display element 100, an optical system 200, and the light guide member 300 as a virtual image display optical system. The image display element 100 outputs an image light of a display image. The optical system 200 collimates and emits the image light from the image display element 100.

The image display element 100 is a device that outputs the image light of the display image that is the basis of the virtual image displayed through the light guide member 300. An organic light emitting diode (OLED) or a transmissive liquid crystal display element is suitable for the image display element 100.

However, other display methods may be applied as the image display element 100. For example, a digital micromirror device (DMD) can be applied as the image display element 100. Further, a thin film transistor (TFT) or a liquid crystal on silicon (LCOS) can be applied as the image display element 100, Further, a micro electromechanical systems (MEMS) can be applied as the image display element 100.

When the LCOS, DMD, or the like that requires a light source is used as the image display element 100, the image display element 100 includes the light source to emit an illumination light to illuminate an image display surface of the image display element 100. Various light sources can be applied to the image display element 100, for example, a light emitting diode (LED), a semiconductor laser diode (LD), a discharge lamp, or the like.

The optical system 200 includes a plurality of optical lenses, apertures, and the like, and emits the image light output from the image display element 100 as parallel light.

The light guide member 300 includes a light incident part 301, a light guide part 302, an image extraction part 303, and a light emitting part 304. The light emitting part 304 is an example of an interface (boundary surface) that reflects the guided image light and emits the image light to an exterior of the light guide member 300.

FIG. 1 is a light path diagram in a center of the image display element 100 corresponding to a virtual image display in a horizontal direction. The optical system 200 having a function of collimate optical system converts position information of the image display element 100 into angle information. The image light emitted from the center of the image display element 100, the position information of which is converted to the angle information by the optical system 200, is incident from the light incident part 301 into the light guide member 300.

Then, the light entering the light guide member 300 propagates through the light guide member 300 while repeating total reflection in a light guide part 302.

When the light incident on the image extraction part 303, the light is emitted from the light emitting part 304 and enters user's eyes. The user can visually recognize the virtual image of the image light by looking forward through the light emitting part 304 of the light guide member 300.

Figure 2:
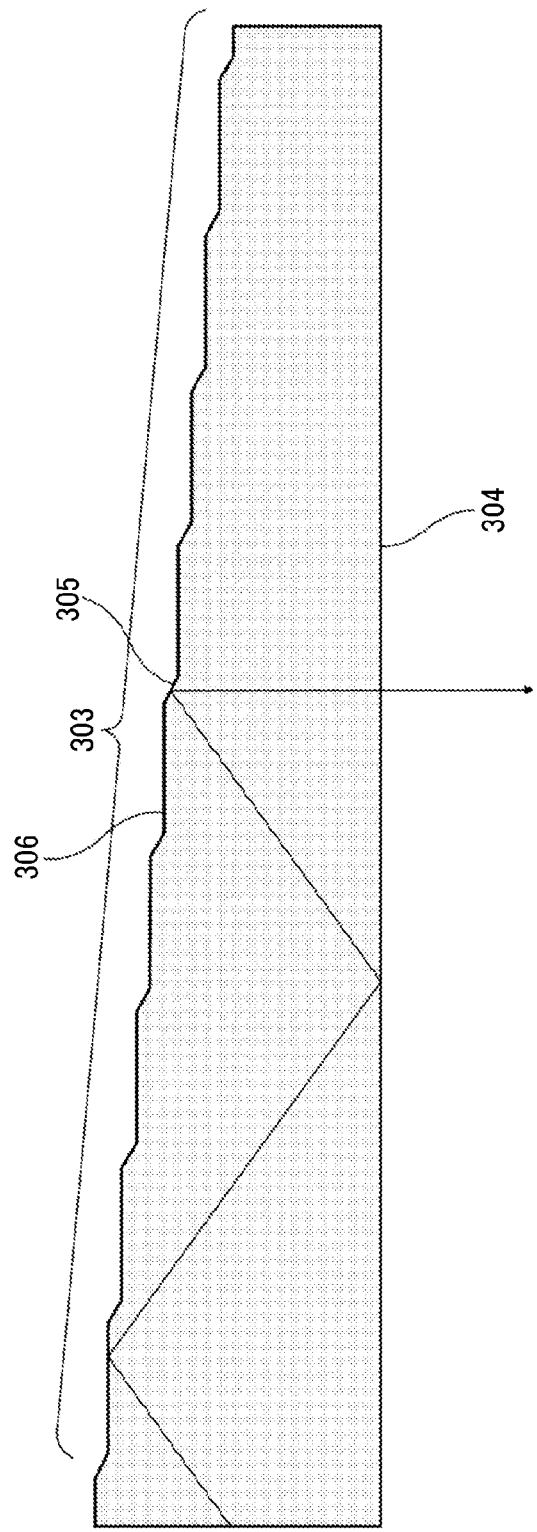
FIG. 2 illustrates a state in which light propagates inside the light guide member and emits from the light guide member according to the present embodiment.

FIG. 2 illustrates a state in which light propagates inside the light guide member 300 and emits from the light guide member 300 according to the present embodiment.

As illustrated in FIG. 2, the image extraction part 303 includes at least a plurality of first surfaces 305 and a plurality of second surfaces 306.

The first surface 305 is an example of a first inclined surface that is inclined so that a distance from the light emitting part 304 becomes smaller in a direction in which the image light is guided. The second surface 306 is an example of an opposing surface that is parallel to the light emitting part 304 and faces the light emitting part 304.

The light propagating through the light guide part 302 while repeating total reflection by the light guide part 302 is incident on the first surface 305 and is emitted from the light emitting part 304 and reaches the eyes. Further, the second surface 306 enables the light to proceed toward a back end of the light guide member 300 until the light is incident on the first surface 305. Thus, the second surface 306 can guide the light toward the light emitting part 304 even at the back end of the light guide member 300. Such a configuration can achieve a virtual image display device 1000 that is displayable a wide angle even if the light guide member 300 is thin.

Figure 3:
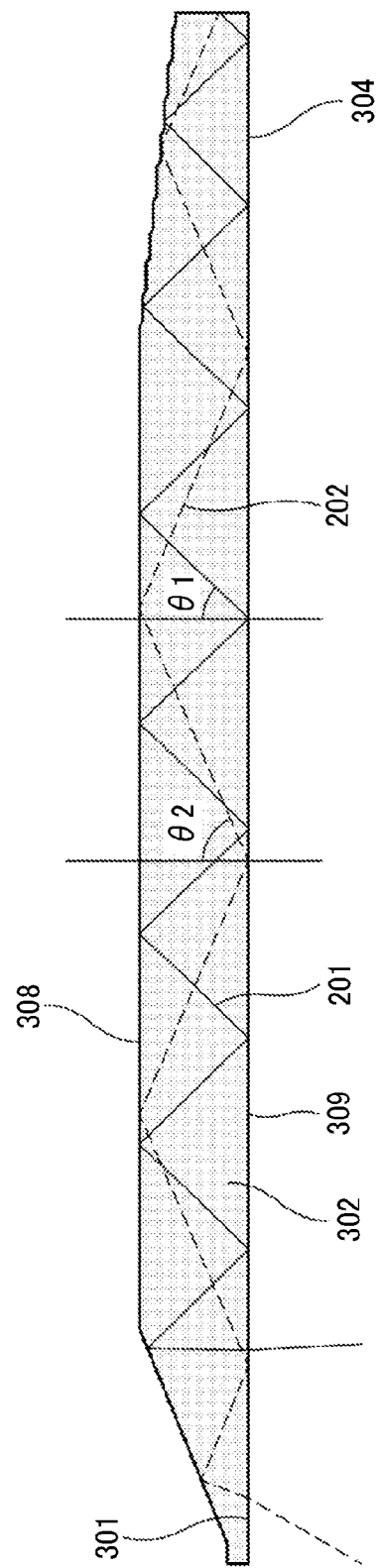
FIG. 3 illustrates the light propagating inside the light guide member according to the present embodiment.

FIG. 3 illustrates the light propagating inside the light guide member 300 according to the present embodiment.

FIG. 3 illustrates light 201 propagating at an angle $\theta_1$ having the smallest reflection angle with respect to the light emitting part 304 and light 202 propagating at an angle $\theta_2$ having the largest reflection angle with respect to the light emitting part 304 among light propagating by total reflection between an upper surface 308 and a lower surface 309 of the light guide part 302 of the light guide member 300. The angle $\theta_1$ and the angle $\theta_2$ may also be referred to as an angle $\theta_x$.

FIG. 3 respectively illustrates the light emitted from pixels at both ends of the image display element 100 in a view of a paper (plane) surface of FIG. 3. That is, the viewing angle can be widened as θ1 becomes smaller and θ2 becomes larger.

Figure 4A:
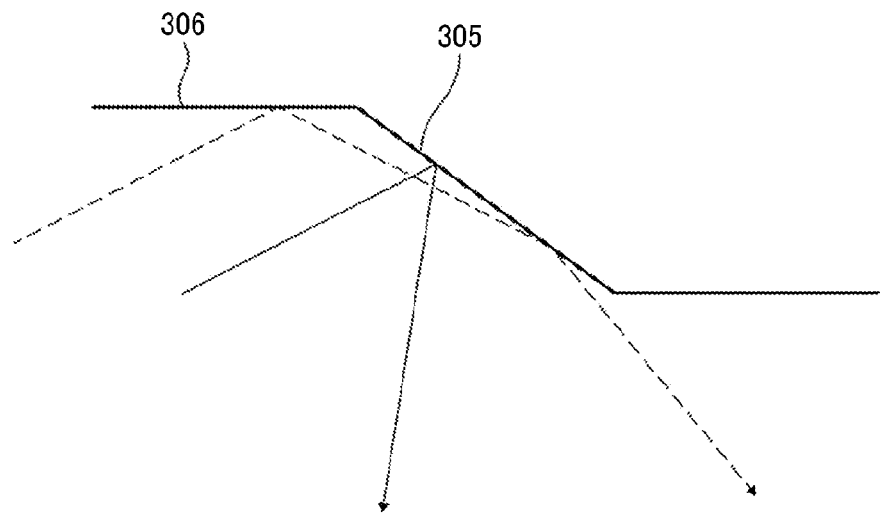
FIG. 4A is an enlarged view of the image extraction part in the light guide member according to a comparative example.
Figure 4B:
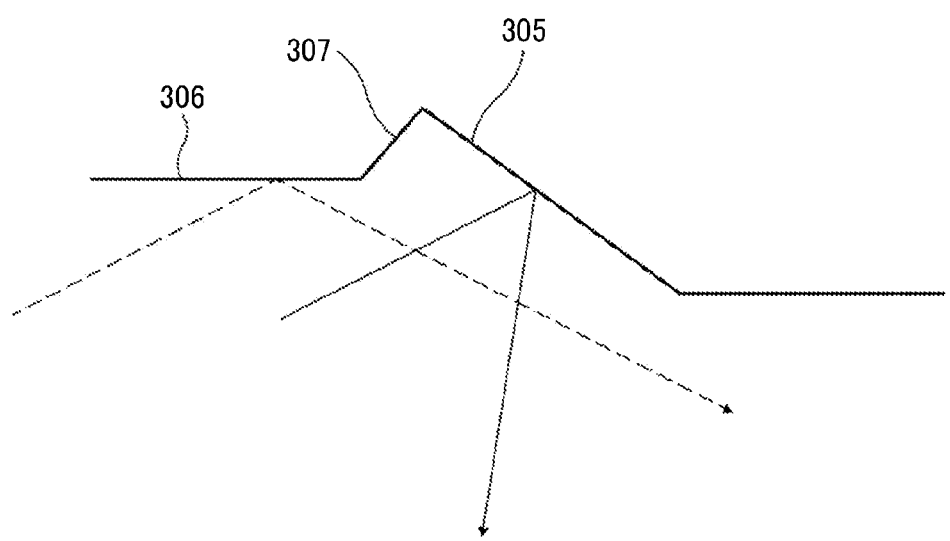
FIG. 4B is an enlarged views of the image extraction part in the light guide member according to the present embodiment.

FIGS. 4A and 4B are enlarged views of the image extraction part 303 in the light guide member 300 according to the present embodiment.

FIG. 4A is an enlarged view of the image extraction part 303 according to a comparative example. In FIG. 4B, the image extraction part 303 includes a new third surface 307 that is inclined in a direction different from an inclination direction of the first surface 305 with respect to FIG. 4A. The third surface 307 is provided between the first surface 305 and the second surface 306. The third surface 307 is an example of a second inclined surface that is inclined so that a distance from the light emitting part 304 becomes larger in a direction in which the image light is guided.

Thus, the third surface 307 (second inclined surface) is between second surface 306 (opposing surface) and the first surface 305 (first inclined surface), and the third surface 307 (second inclined surface) is inclined at a different angle with the first surface 305 (first inclined surface) in the light guiding direction (rightward direction in FIG. 4B). Thus, the second inclined surface (third surface 307) is upstream of the first inclined surface (first surface 305) in the guiding direction (light guide direction).

The light indicated by a solid line and a broken line in FIGS. 4A and 4B is the light emitted from the same pixel of the image display element 100. The light illustrated in FIGS. 4A and 4B propagate inside the light guide member 300 at the same angle by the optical system 200 having the function of the collimate optical system.

At this time, the light indicated by the broken line in FIG. 4A is directly incident on the first surface 305 and travels toward a direction of the light emitting part 304 after being reflected from the second surface 306. In FIG. 4B, the third surface 307 is provided so that the third surface 307 can prevent the light from directly incident on the first surface 305 after the light is reflected from the second surface 306.

As a result, only the light totally reflected from the lower surface of the light guide member 300 can be incident on the first surface 305 among the light propagating by the total reflection in the light guide member 300.

Such a configuration can prevent the stray light. The stray light is generated by the light from both directions of the light totally reflected from the upper surface and the lower surface of the light guide member 300 being incident on the first surface 305 in FIG. 4A according to the comparative example.

Figure 5:
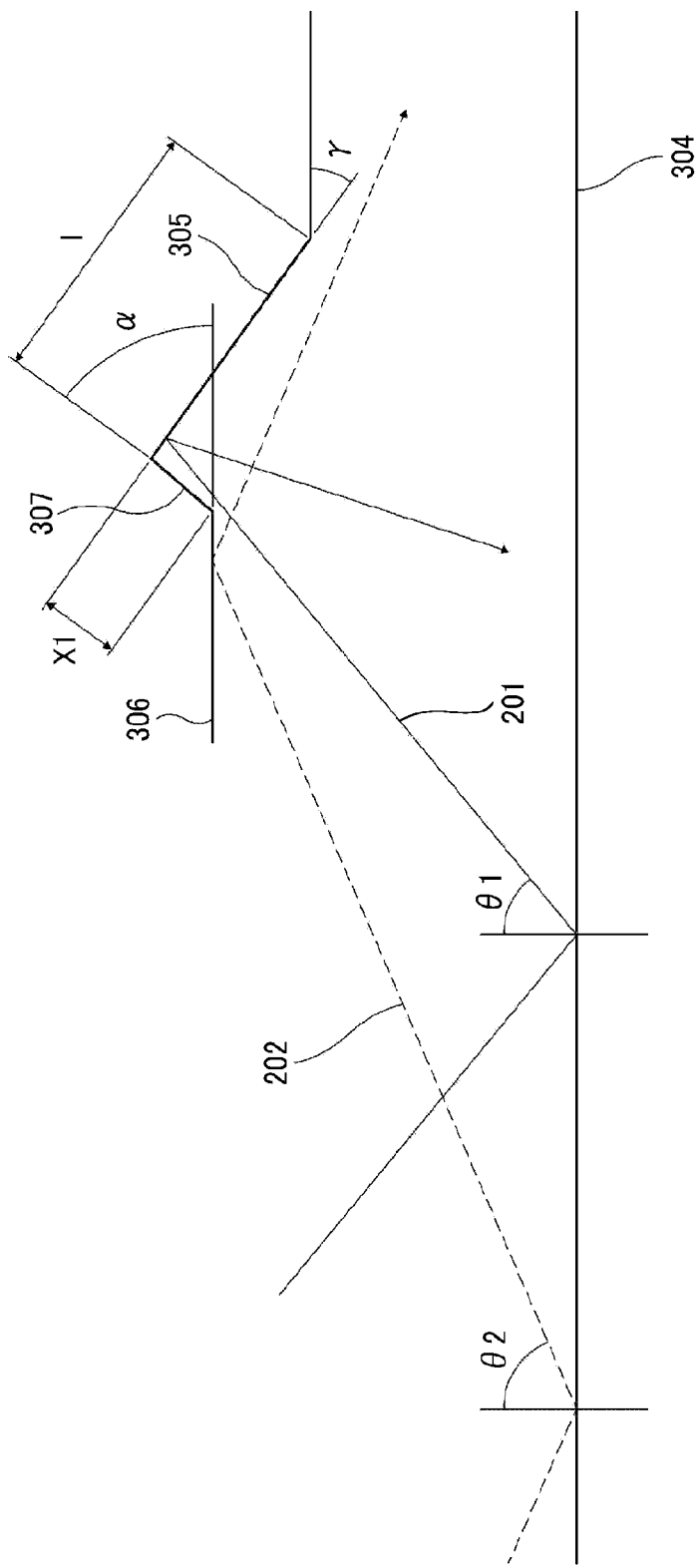
FIG. 5 illustrates a length "l", an inclination angle "γ", a length "X1", and an inclination angle "a" in FIG. 4B.

FIG. 5 illustrates a length "1", an inclination angle "γ", a length "X1", and an inclination angle "α" in FIG. 4B.

FIG. 5 illustrates lengths of the first surface 305 and the third surface 307 of the image extraction part 303 and the angle with respect to the light emitting part 304 in the same cross section. The light 201 indicates the light propagating at an angle θ1 having the smallest reflection angle among the light propagating in the light guide member 300 by total reflection. When the light reflected from the lower surface 309 of the light guide member 300 is incident on the third surface 307, the angle of the light changes and becomes stray light. Thus, it is necessary to prevent the light 201 propagating at the angle θ1 having the smallest reflection angle from incident on the third surface 307. In the same cross section, it is possible to prevent generation of the stray light by setting the angle "α" of the third surface 307 with respect to the light emitting part 304 to α≥90°−θ1. Thus, the light guide member 300 can reduce the angle θ1 to achieve the wide viewing angle.

Further, the light 202 propagates at the angle θ2 having the largest reflection angle among the light propagating in the light guide member 300 by total reflection. The light 202 is the light totally reflected from the lower surface 309 of the light guide member 300, reflected from the first surface 305, and emitted from the light emitting part 304. The light 202 emitted from the light emitting part 304 is originally observed as an image.

However, when the light totally reflected from the upper surface 308 of the light guide member 300 directly is incident on the first surface 305, the angle of the light emitted from the light emitting part 304 changes to become stray light.

Therefore, it is necessary to dispose the first surface 305 on an upper part of the second surface 306 by the length X1 when the length of the first surface 305 is "1" to prevent the light, which is totally reflected from the upper surface 308 of the light guide member 300, from directly incident on the first surface 305.

At this time, if =90°−θ2, then in the same cross section, the length X1 is set to X1>l(|tan (γ)|−|tan (β)|)/(|tan (α)|+|tan (β)|)·|cos (γ)/cos (α)| so that it is possible to prevent the light, which is totally reflected from the upper surface 308 of the light guide member 300, from directly incident on the first surface 305 to prevent stray light. Further, it is possible to achieve a wide viewing angle by increasing the angle θ2.

Figure 6:
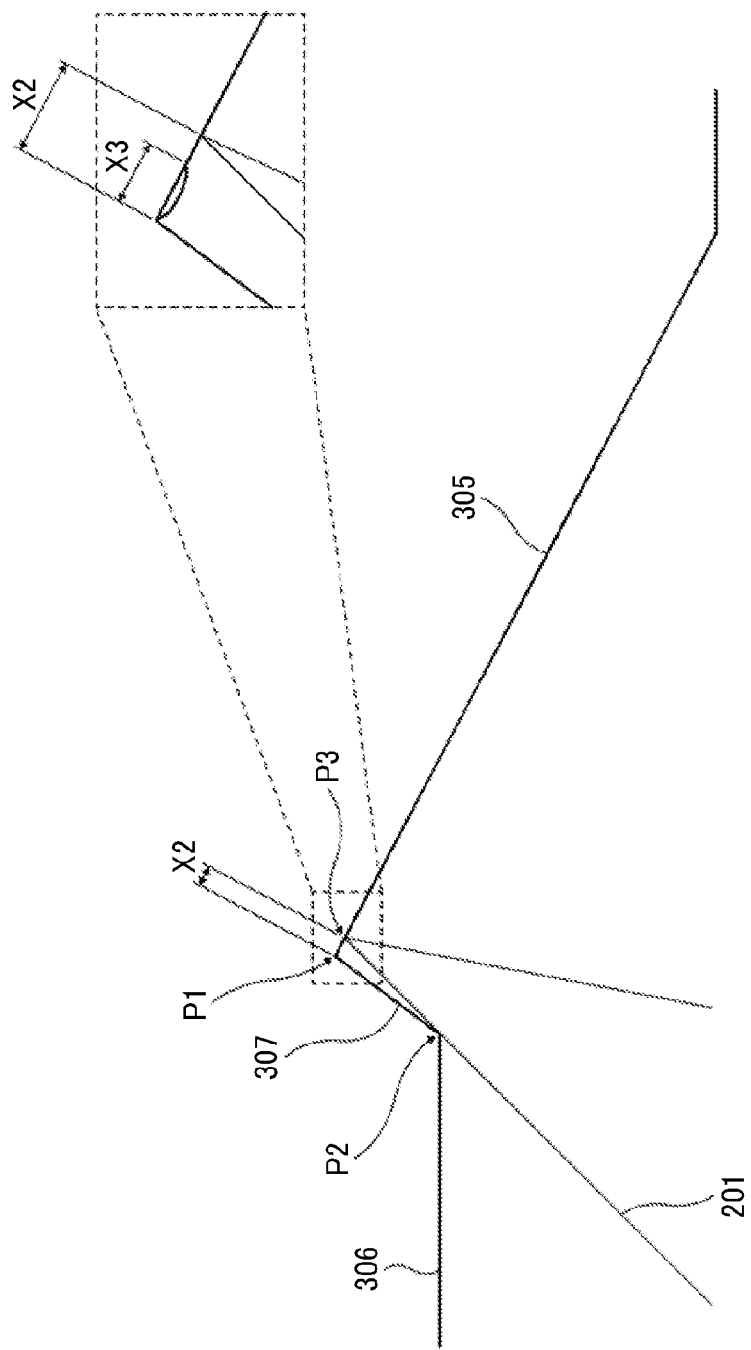
FIG. 6 illustrates the light propagating at the minimum value θ1 of the reflection angle θ in FIG. 4B.

FIG. 6 illustrates the light 201 propagating at the minimum value θ1 of the reflection angle θ in FIG. 4B.

FIG. 6 is an enlarged view of the image extraction part 303. For example, when the light guide member 300 is manufactured by molding, a region X3 in FIG. 6 may have a shape error due to molding defects. The value of X3 may be in an order of few μm.

If the X3 part is exposed to light, a traveling direction of the light is disturbed, resulting in stray light or flare that may deteriorate image quality. Therefore, it is necessary to further increase the angle "α" illustrated in FIG. 5 so that the light 201 propagating at the angle θ1 having the smallest reflection angle is not incident on the part of X3 in the first surface 305. The above configuration can prevent the X3 part from exposing to light to enable the user to observe a good image without stray light or flare. The angle α is increased to enable the user to observe a good image with a wide viewing angle without stray light. However, the angle α is preferably less than 90° (α<90°). As a result, it is possible to efficiently manufacture the light guide plate by resin molding.

Figure 7:
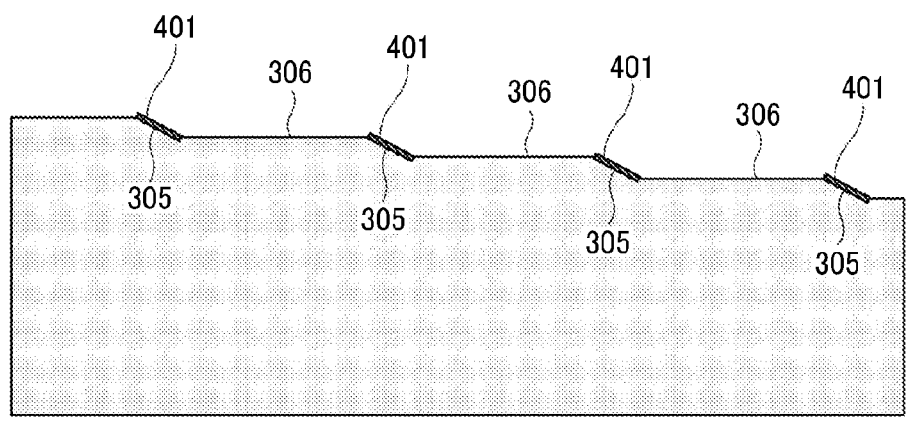
FIG. 7 illustrates a modified example of the light guide member according to the present embodiment.

FIG. 7 illustrates a modified example of the light guide member 300 according to the present embodiment.

FIG. 7 illustrates the light guide member 300 in which the first surface 305 of the image extraction part 303 is subjected to a reflection coating. The light propagating in the light guide member 300 by total reflection is reflected from the first surface 305 when the light is not incident on the first surface 305, onto which the reflection coating is applied, and the light heads toward the light emitting part 304. The reflection coating has a reflection property to reflect light.

Then, the light emitted from the light emitting part 304 enters the eyes and is observed as a virtual image. At this time, the reflection coating is not applied onto the second surface 306 so that the user can see outside world through the light guide member 300, and the virtual image can be superimposed on the real world.

Figure 8:
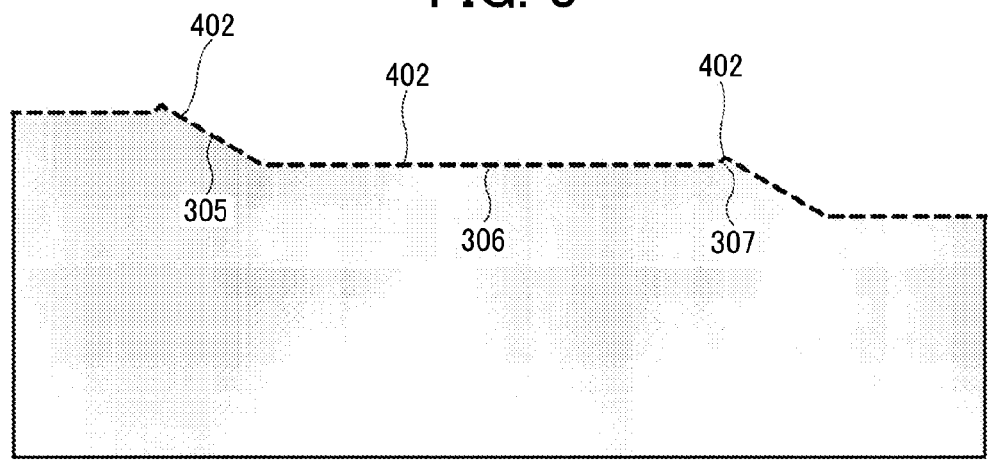
FIG. 8 illustrates a second modified example of the light guide member according to the present embodiment.

FIG. 8 illustrates a second modified example of the light guide member 300 according to the present embodiment.

FIG. 8 illustrates the light guide member 300 in which a coating 402 having a reflection and transmission function is applied to all of the first surface 305, the second surface 306, and the third surface 307 of the image extraction part 303. As illustrated in FIG. 8, the coating 402 having the reflection and transmission function is also applied to the second surface 306, so that a transmittance for the user to see the outside world decreases. However, since all of the first surface 305, the second surface 306, and the third surface 307 is applied with coating at once, it becomes easier to manufacture the light guide member 300 at a time of film formation.

Figure 9:
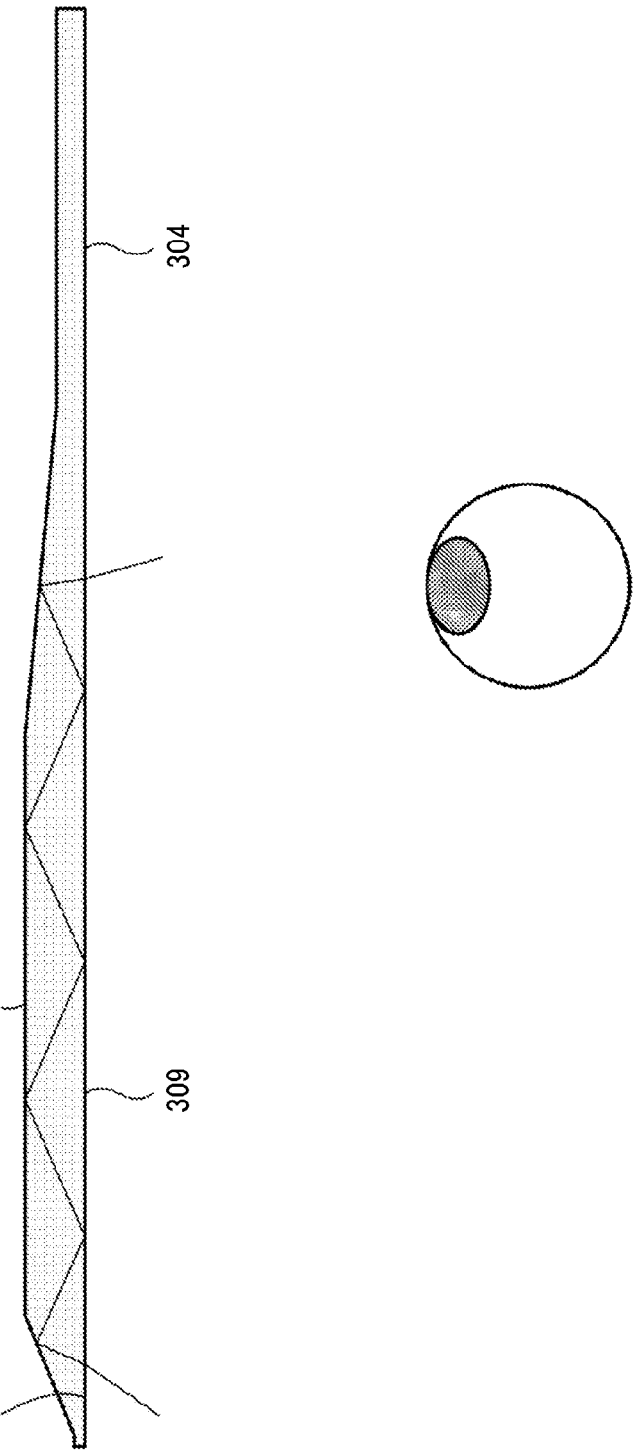
FIG. 9 illustrates a comparative example of the light guide member according to the present embodiment.

FIG. 9 illustrate a comparative example of the light guide member 300 according to the present embodiment.

FIG. 9 illustrates a state in which light emitted from one pixel on the image display element 100 travels through the light guide member 300 of FIG. 1. As illustrated in FIG. 9, the light incident on the light guide member 300 from the light incident part 301 propagates in the light guide member 300 while repeating total reflection. However, the light may not be incident on the inclined first surface 305 in the image extraction part 303, or even the light is incident on the first surface 305, the light may not reach the eyes as illustrated in FIG. 9 depending on a propagation angle of the light in the light guide member 300. In such a case, missing image is displayed in the image, and the image quality is deteriorated.

Figure 10:
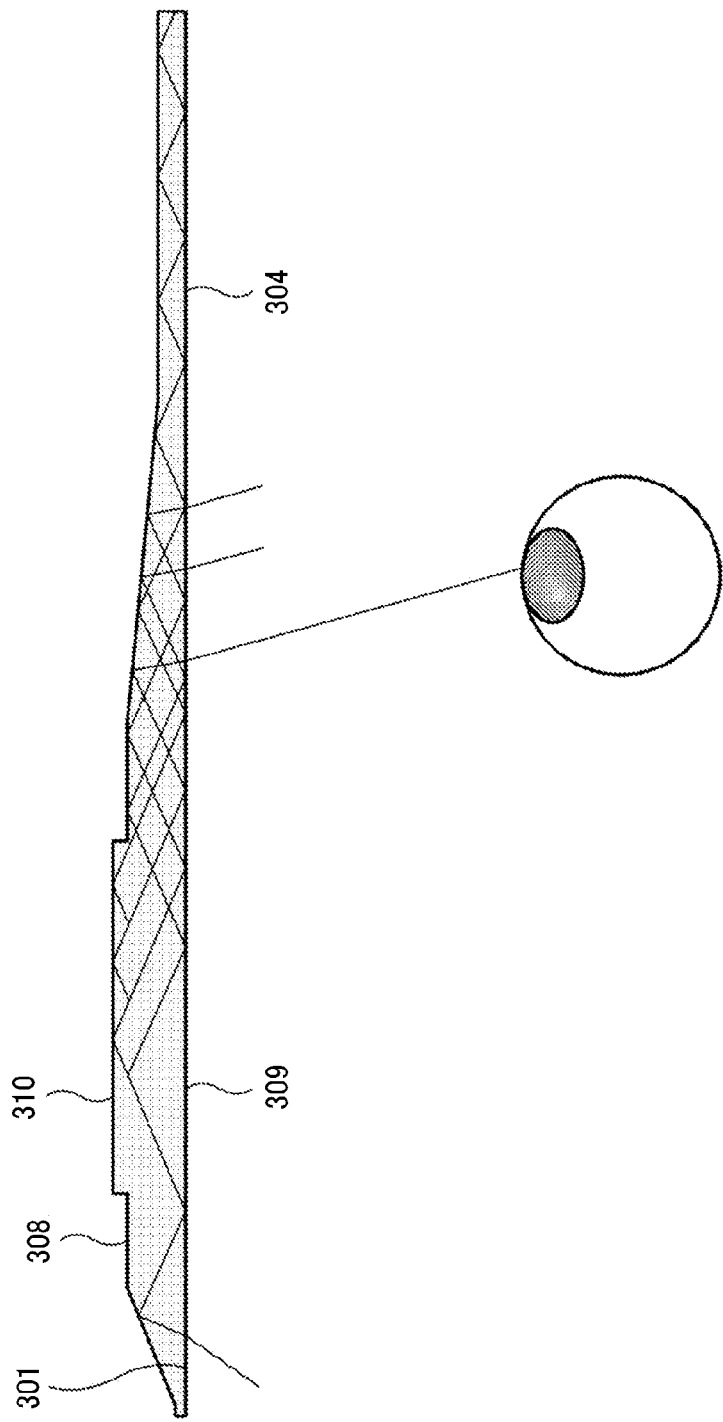
FIG. 10 illustrates a third modified example of the light guide member according to the present embodiment.

FIG. 10 illustrates a third modified example of the light guide member 300 according to the present embodiment.

FIG. 10 illustrates the light guide member 300 in which a parallel plane member 310 having a parallel plane is newly joined to the light guide member 300 with respect to FIG. 9. A coating 403 (see FIG. 11) having reflection and transmission characteristics is applied to a surface of the parallel plane member 310 on which the light guide member 300 is joined.

In FIG. 10, the parallel plane member 310 is joined to the upper surface 308 of the light guide member 300, but the parallel plane member 310 may be joined to the lower surface 309. Thus, at least one of the boundary surface (light emitting part 304) and the opposing surface (second surface 306) has a parallel plane member 310 joined with a joint. Similar to FIG. 9, FIG. 10 illustrates the light that is emitted from one pixel in the image display element 100 and travels through the light guide member 300. Unlike FIG. 9, in FIG. 10, the light propagates in the light guide member 300 with multiple reflection between the light guide member 300 and the parallel plane member 310 by the coating 403 having the reflection and transmission characteristics. Thus, it can be seen from FIG. 10 in which an apparent light in the light guide member 300 increases as compared with FIG. 9.

Thus, a joint between the parallel plane member 310 and said at least one of the boundary surface (light emitting part 304) and the opposing surface (second surface 306) includes a coating 403 having reflection and transmission characteristics.

Such a configuration can increase a frequency of the light incident on the inclined first surface 305 in the image extraction part 303 than a frequency of the light incident on the first surface 305 in FIG. 9 so that the light easily reaches the user's eyes. Thus, it is possible to observe a good image without missing image.

Figure 11:
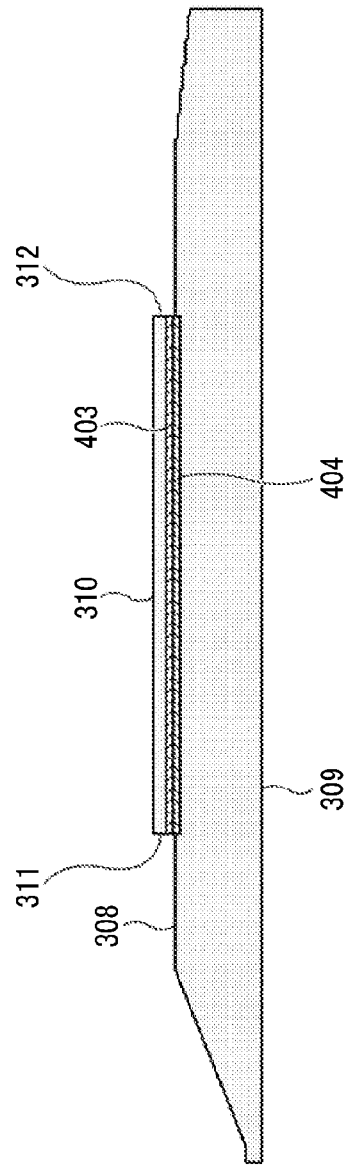
FIG. 11 illustrates details of the light guide member according to the third modification example as illustrated in FIG. 10.

FIG. 11 illustrates details of the light guide member 300 according to the third modification example as illustrated in FIG. 10. FIG. 11 illustrates a state of joining the light guide member 300 and the parallel plane member 310. In FIG. 11, the parallel plane member 310 is coated with a coating 403 having reflection and transmission characteristics. The parallel plane member 310 is joined to the upper surface 308 of the light guide member 300 via the adhesive layer 404. The light guide member 300 may be coated with the coating 403 having reflection and transmission characteristics, and then the parallel plane member 310 may be joined to the light guide member 300 via the adhesive layer 404.

The coating 403 having reflection and transmission characteristics is, for example, applied with a coating having half mirror characteristics, and a dielectric film or a metallic coating such as silver or aluminum is applied. The half mirror characteristic of the coating 403 having the reflection and transmittance characteristics is not limited to the characteristics having a reflectance of 50% and transmittance of 50%, and may be, for example, a reflectance of 30% and a transmittance of 70%. Further, the adhesive layer 404 is preferably made of a material having a refractive index similar to the refractive index of the light guide member 300 and the parallel plane member 310.

Such a configuration of the adhesive layer 404 can reduce an angular deviation of a light ray in the adhesive layer 404. Further, ends 311 and 312 of the parallel plane member 310 are formed of a paint that absorbs light or a shape that allows light to pass through. It is desirable that the light reflected from the ends 311 and 312 does not propagate in the light guide member 300 again. Such a configuration of the ends 311 and 312 of the parallel plane member 310 can prevent unnecessary light from entering the image.

Figure 12:
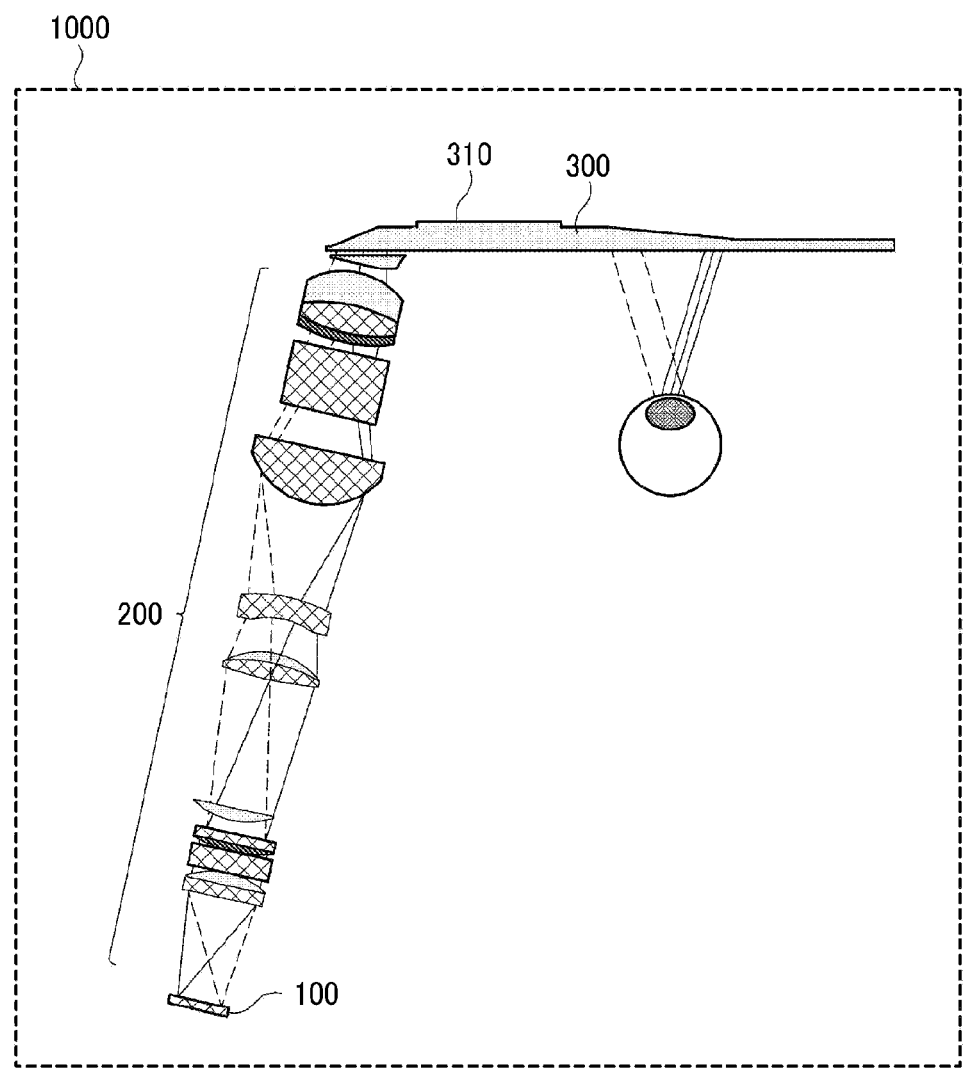
FIG. 12 illustrates a layout of an optical system of the virtual image display device according to the present embodiment.

FIG. 12 illustrates a layout of an optical system of the virtual image display device 1000 according to the present embodiment.

Example 1: FIG. 12

1) Virtual image display device 1000
Viewing angle (diagonal): 40 degrees
2) Image display element 100
Display area: 5.0 mm×3.1 mm
3) Light guide member 300
a) Material: ZEONEX E48R manufactured by Zeon Corporation
b) Thickness: thinnest part: 1.2 mm and thickest part 2.5 mm
c) Length: 59 mm
d) Width: 50 mm
e) Image extraction part (303)
f) First surface 305: l=0.23 mm, X2=3.2 μm, γ=28°
g) Length of the second surface 306: 0.492 to 0.717 mm
h) Third surface 307: X1=0.038 mm, α=52°
i) Assumed value of propagation angle: θ1=42.8°, θ2=69.2°
j) Eye box: 5 mm or more in a horizontal direction
k) Eye relief: 15 mm or more
4) Parallel plane member 310
a) 14.8 mm×21 mm×0.6 mm
b) Material: polymethyl methacrylate (PMMA)

The optical system 200 illustrated in FIG. 12 generates substantially collimator light after once creating an intermediate image of the light emitted from the image display element 100, and the optical system 200 causes the light to enter the light guide member 300. The optical system 200 once creating the intermediate image in the above-described way so that a heavy image display element 100 can be arranged at the rear end of the virtual image display device 1000. Thus, if the virtual image display device 1000 is a glasses type, a front weight of the virtual image display device 1000 can be reduced so that a comfortable glasses type virtual image display device can be realized.

Of course, the light may be directly incident on the light guide member 300 by the optical system 200 that generates substantially collimator light from the image display element 100 as illustrated in FIG. 1 without forming an intermediate image. The light guide member 300 of FIG. 12 has the shape illustrated in FIG. 10 to which the parallel plane member 310 is joined. FIG. 12 illustrates a state in which the light emitted from both ends of the image display element 100 enters the eyes after being incident on the light guide member 300 via the optical system 200.

Figure 13:
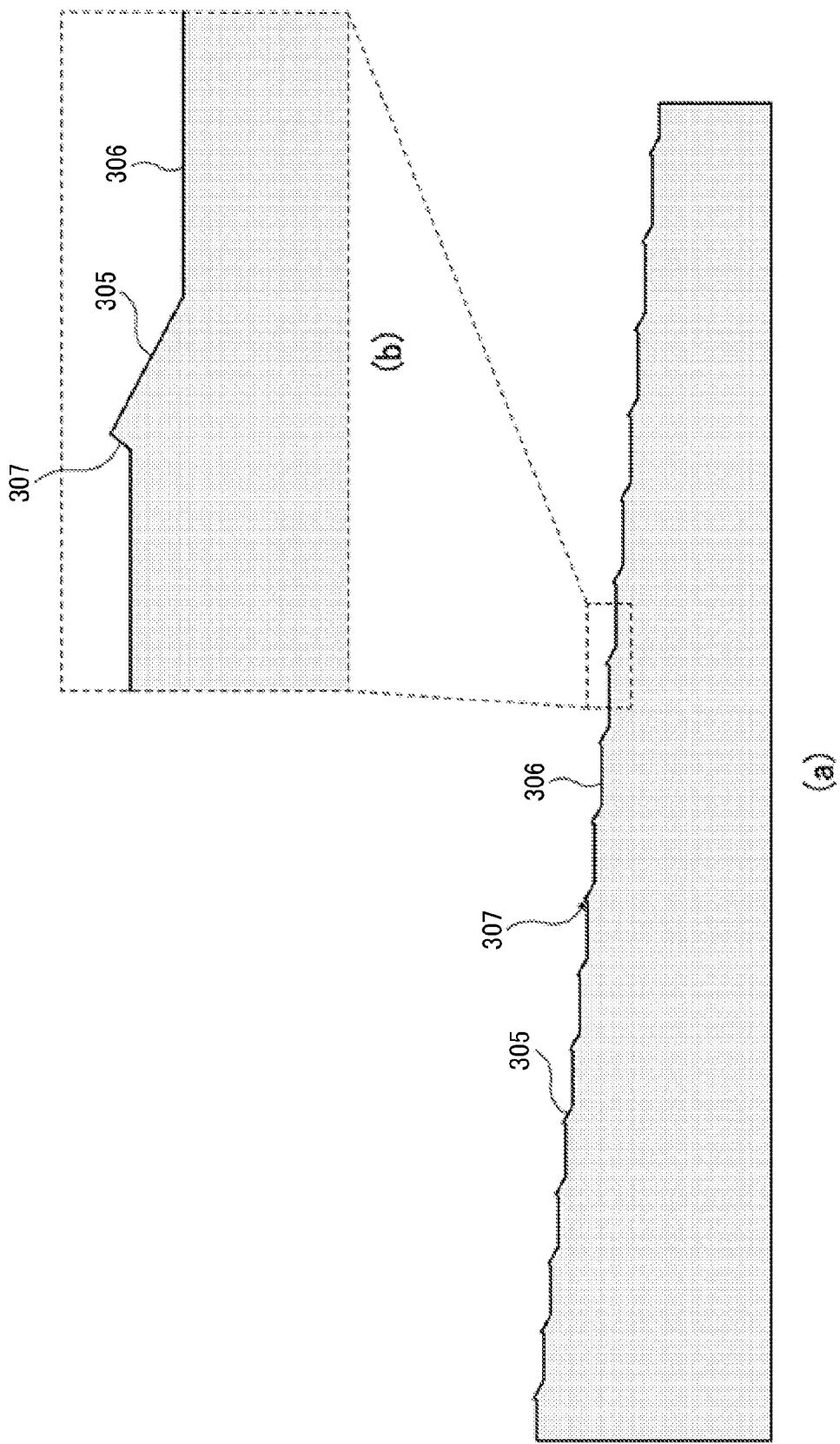
FIG. 13 is an enlarged view of the image extraction part of the virtual image display device illustrated in FIG. 12.

FIG. 13 is an enlarged view of the image extraction part 303 of the virtual image display device 1000 illustrated in FIG. 12.

FIG. 13(a) is an enlarged view of the image extraction part 303 of the light guide member 300. FIG. 13(b) is an enlarged view of the first surface 305, the second surface 306, and the third surface 307 of one element. In the present embodiment, the image extraction part 303 of FIG. 13(b) includes 17 elements. However, a number of elements may be changed by setting the viewing angle in the horizontal direction and setting a range (eye box) visible by moving eyes.

Further, there are sixteen second surfaces 306 between the first surfaces 305 and next third surfaces 307 in the present embodiment. However, the length of each of the second surfaces 306 are increased according to the traveling direction of the light in the light guide member 300. Such a configuration can control an amount of light that is incident on the first surface 305 and reduce unevenness in resolution in the image.

Figure 14:
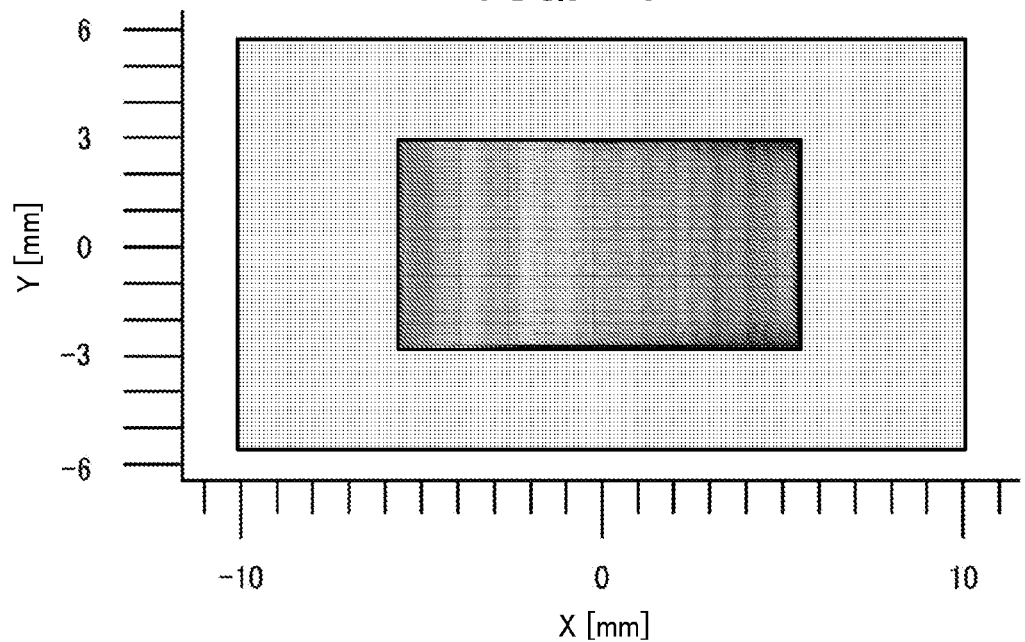
FIG. 14 illustrates a simulation of a state of luminance distribution of virtual image in the virtual image display device according to the present embodiment.

FIG. 14 illustrates a simulation of a state of luminance distribution of the virtual image in the virtual image display device 1000 according to the present embodiment.

Specifically, FIG. 14 is a result of the simulation of the state of the luminance distribution of the virtual image in the present embodiment illustrated in FIG. 12.

Figure 15:
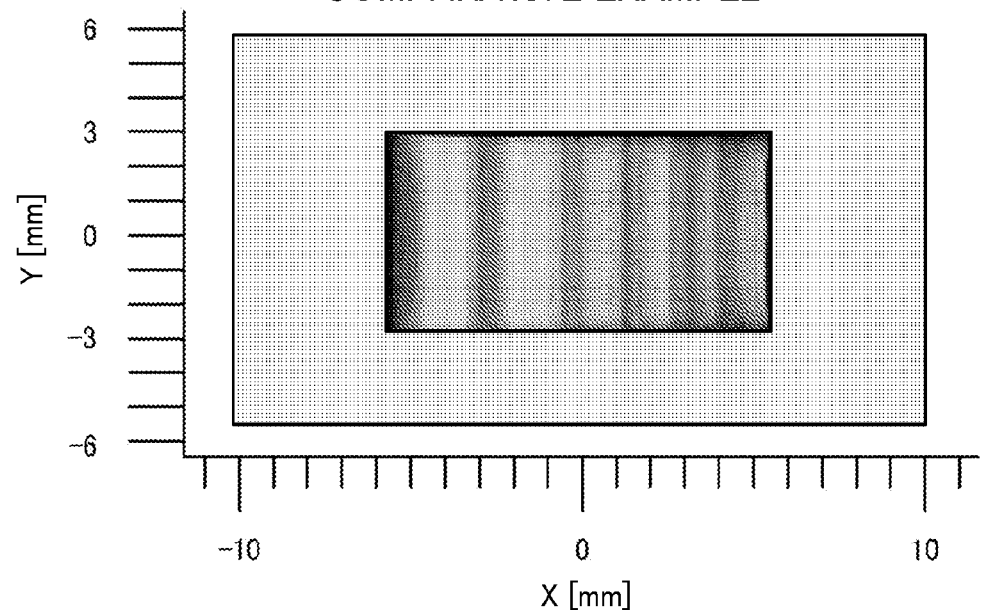
FIG. 15 illustrates a simulation of a state of luminance distribution of the virtual image in a comparative example of the virtual image display device according to the present embodiment.

FIG. 15 illustrates a simulation of a state of luminance distribution of the virtual image in a comparative example of the virtual image display device 1000 according to the present embodiment.

Specifically, FIG. 15 is a result of the simulation of the state of the luminance distribution of the virtual image when the parallel plane members 310 is not joined to the light guide member 300 in the present embodiment illustrated in FIG. 12. A black part having low luminance is conspicuous in the luminance distribution of the virtual image in FIG. 15. In FIG. 14, it can be seen that parts that appear black are reduced and the uneven luminance is improved.

Of course, FIGS. 1 to 15 hold even if left and right are reversed. It is also possible to check one light guide member 300 with both eyes. The light guide member 300 can be divided into two parts so that the user can see the light guide member 300 with each eye. A size of the light guide member 300 can be reduced so that a monocular system becomes possible.

In the embodiments illustrated in FIGS. 1 to 15 as described above, it is described an example in which the light incident part 301 of the light guide member 300 is disposed on a left side of a virtual image observer, and the image light is incident from a left side of the virtual image observer. The same effect as described above can be obtained when the arrangement is reversed left and right, that is, when the light incident part 301 of the light guide member 300 is disposed on a right side of the virtual image observer, and the image light is incident on the right side of the virtual image observer.

Figure 16A:
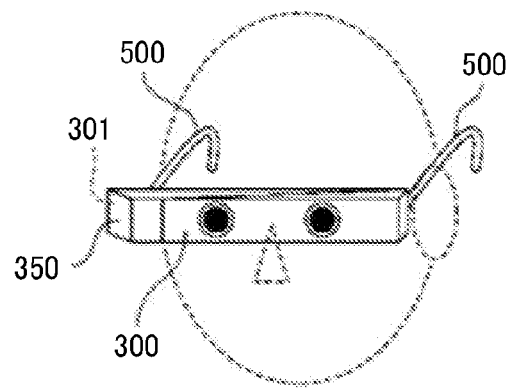
FIGS. 16A to 16C illustrate a usage state of various examples of the virtual image display device according to the present embodiment.
Figure 16B:
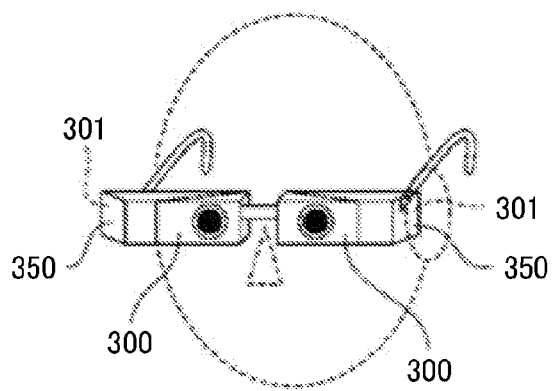
Figure 16C:
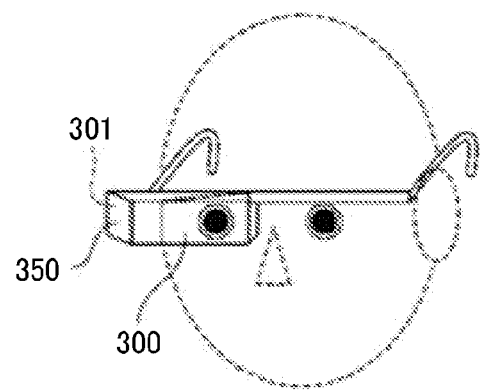

FIGS. 16A to 16C illustrate a usage state of various examples of the virtual image display device 1000 according to the present embodiment. FIGS. 16A, 16B, and 16C illustrate examples of cases in which the light guide member 300 is applied to the virtual image display device 1000 of a spectacle-type, that is, a head mount display (HMD).

The example illustrated in FIG. 16A is a case in which one light guide member 300 is applied to the HMD for both eyes. A light incident part 301 of the light guide member 300 and a mirror 350 are arranged on the right side of the virtual image observer, that is, the user. The mirror 350 guides the image light incident from the light incident part 301 into the light guide member 300. The light guide member 300 is fixed to a frame 500 that serves as a temple hung on the user's ear. Although the frame 500 is simplified in FIG. 26, the frame 500 may have a shape that covers not only both ends of the light guide member 300 but also convers an upper edge and a lower edge of the light guide member 300.

On the other hand, the examples illustrated in FIGS. 16B and 16C are cases in which one light guide member 300 is miniaturized and applied to the HMD. An example illustrated in FIG. 16B is a case in which two light guide members 300 are arranged as the HMDs for both eyes. The two light guide members 300 respectively correspond to the positions of the left and right eyes of the user. The light incident parts 301 of the light guide members 300 are respectively disposed on the left and right outer ends. Further, FIG. 16C illustrates a case in which one light guide member 300 is arranged as the HMD for a monocular. The one light guide member 300 corresponds to one of positions of either the left or right eye of the user.

Although a virtual image optical system and the light source are abbreviated in FIGS. 16A to 16C, the virtual image optical system and the light source can be attached to the frame 500. That is, in the examples illustrated in FIGS. 16A and 16C, the light source, the image display element 100, and the optical system 200 are attached to the frame on the right eye part. In the example illustrated in FIG. 16B, the light source, the image display element 100, and the optical system 200 are attached to both the left and right frame.

The examples in FIGS. 16A to 16C illustrate the light guide member 300 applied to a spectacle-shaped HMD. Further, the light guide member 300 of each of the above-described embodiment can be applied to other types of HMDs, and further can be applied to a head-up display (HUD). The light guide member of each embodiment is particularly suitable for displaying an original image formed by a light flux that is light-modulated by a micro device.

As described above, the light guide member 300 can be attached to a human face like glasses. Then, when the image light of the image display element or the like is collimated and incident from the light incident part 301, the image of the image display element or the like can be observed as a virtual image as described above. Since the light guide member 300 is a transparent body, the user can observe a surrounding scene together with the above image.

<Summary>

As described above, the light guide member 300 according to an embodiment of the present disclosure includes a light emitting part 304, a second surface 306, a first surface 305, and a third surface 307. The light emitting part 304 is an example of an interface (boundary surface) that reflects the guided image light and emits the light to an exterior of the light guide member 300. The second surface 306 is an example of an opposing surface parallel to the light emitting part 304.

The first surface 305 is an example of a first inclined surface that is inclined so that a distance from the interface decreases in a direction in which the image light is guided. The third surface 307 is an example of a second inclined surface provided between the second surface 306 and the first surface 305. The third surface 307 is inclined so that the distance from the interface increases in a direction in which the image light is guided. Assuming that the angle formed by the third surface 307 with respect to the light emitting part 304 is a, and the minimum value of the reflection angle θ of the image light with respect to the light emitting part 304 is θ1, α≥90°−θ1 is satisfied.

The light guide member 300 includes the third surface 307 between second surface 306 and the first surface 305, and the third surface 307 is inclined so that a distance from the interface increases in the direction in which the image light is guided. Thus, the light guide member 300 can reduce the stray light generated by the image light that is reflected from the second surface 306 and is further re-reflected from the first surface 305.

Further, the light guide member 300 satisfies the condition of α≥90°−θ1 when the angle formed by the third surface 307 with respect to the light emitting part 304 is a, and the minimum value of the reflection angle θ of the image light with respect to the light emitting part 304 is e1. Thus, the light guide member 300 can reduce the stray light generated by the image light that is reflected from the light emitting part 304 and is further re-reflected from the third surface 307.

A distance between the second inclined surface (third surface 307) and the boundary surface (light emitting part 304) increases in the guiding direction (light guide direction).

That is, the light guide member 300 can reduce the stray light generated by the re-reflection at the first surface 305 and the reflection at the third surface 307 while achieving a wide viewing angle by reducing the minimum value θ1 of the reflection angle θ of the image light with respect to the light emitting part 304.

The light guide member 300 according to the embodiment of the present disclosure includes the light emitting part 304, the second surface 306, the first surface 305, and the third surface 307. The light emitting part 304 reflects the guided image light and emits the light to an exterior of the light guide member 300. The second surface 306 opposes (faces) the light emitting part 304. The first surface 305 is inclined so that the distance from the interface decreases in the direction in which the image light is guided.

The third surface 307 is provided between the second surface 306 and the first surface 305. The third surface 307 is inclined so that the distance from the interface increases in the direction in which the image light is guided. Assuming that the angle formed by the first surface 305 with respect to the light emitting part 304 is γ, the maximum value of the reflection angle θ of the image light with respect to the light emitting part 304 is θ2, the length of the first surface 305 is 1, the length of the third surface 307 is X1, and β=90°−θ2, then it is satisfied that X1>l(|tan(γ)|−|tan (β)|)/(tan (α)|+|tan (β)|)·|cos(γ)/cos(α)|.

As a result, the light guide member 300 can reduce the stray light generated by the image light that is reflected from the second surface 306 and is further re-reflected from the first surface 305 while increasing the maximum value θ2 of the reflection angle θ of the image light with respect to the light emitting part 304 to achieve a wide viewing angle.

A first intersection P1 is an intersection of the first surface 305 and the third surface 307, a second intersection P2 is an intersection of the third surface 307 and the second surface 306, a third intersection P3 is an intersection of the first surface 305 and the image light guided by the minimum value θ1 of the reflection angle θ with respect to the light emitting part 304 when the image light passes an area adjacent to the intersection P2 in the light guide member 300, and a distance X2 is between P1 and P3.

The image light guided through the light guide member 300 is not incident on a region having the distance X2 in the first surface 305 (see FIGS. 5 and 6). The distance X2 is defined by ξ=α+θ−90°, η=α+γ−ξ, and X2=X1 (sin(ξ)/sin (η)).

Thus, the first surface 305 (first inclined surface) includes a region having a distance X2. The image light guided through the light guide member 300 is not incident on the region in the first surface 305 (first inclined surface).

The distance X2 is defined by ξ=α+θ−90°, η=α+γ−ξ, and X2=X1 (sin(ξ)/sin(η)).

The distance X2 is a distance between a first intersection P1 and a third intersection P3.

The first intersection P1 is an intersection of the first surface 305 (first inclined surface) and the third surface 307 (second inclined surface).

The second intersection P2 is an intersection of the third surface 307 (second inclined surface) and the second surface 306 (opposing surface).

The third intersection P3 is an intersection of the first surface 305 (first inclined surface) and the image light that passes an area adjacent to the second intersection P2 and is incident on the first surface 305 (first inclined surface) at the minimum value θ1 of the reflection angle θ.

As a result, the light guide member 300 includes a region in which the image light guided through the light guide member 300 is not incident on the first surface 305. Thus, the light guide member 300 can prevent light from incident on a shape error part of the light guide member 300 due to molding defects and the like. Thus, the light guide member 300 can prevent the stray light and flare to provide a good image.

Multiple second surface 306, multiple third surfaces 307, and multiple first surfaces 305 are repeatedly arranged so that the second surface 306, the third surface 307, and the first surface 305 approaches the light emitting part 304 in the direction in which the image light is guided. As a result, the image light guided through the light guide member 300 is easily incident on the first surface 305 even when the viewing angle is wide so that the light guide member 300 can provide a good image with less uneven luminance.

Thus, multiple sets each including one of the multiple opposing surfaces (second surfaces 306), one of the multiple first inclined surfaces (first surfaces 305), and one of the multiple second inclined surfaces (third surfaces 307) are repeatedly disposed in the guiding direction (light guide direction), and a distance between one of the multiple opposing surfaces (second surfaces 306) and the boundary surface (light emitting part 304) gradually decreases in the guiding direction (light guide direction).

The lengths of the plurality of second surfaces 306 are different from each other. As a result, the light guide member 300 can control the amount of light that is incident on the first surface 305 by making the length of the second surface 306 different. Thus, the light guide member 300 can reduce unevenness of resolution in the image to provide a good image.

Thus, the multiple opposing surfaces (second surfaces 306) have different lengths from each other.

The light guide member 300 includes a reflection coating 401 on the first surface 305. As a result, the light guide member 300 can efficiently guide the image light toward the light emitting part 304 when the image light propagating in the light guide member 300 is incident on the first surface 305 so that the light guide member 300 can provide a good image.

The light guide member 300 includes the coating 402 having reflection and transmission characteristics on the first surface 305, the second surface 306, and the third surface 307. As a result, the light guide member 300 can simplify a vapor deposition process of coating while ensuring see-through property of the light guide member 300 for seeing the outside world.

The light guide member 300 has two parallel surfaces (upper surface 308 and lower surface 309) that guide the image light by repeating total reflection. A parallel plane member 310 is joined to at least one of the two surfaces (upper surface 308 and lower surface 309). A joint part of the parallel plane member 310 has the coating 403 having reflection and transmission characteristics. As a result, the light guide member 300 can provide a good image without image omission by multiple reflection of the light in the parallel plane member 310.

The virtual image display device 1000 according to an embodiment of the present disclosure includes the image display element 100, the above-described light guide member 300, and the optical system 200. The light guide member 300 guides the image light emitted from the image display element 100 and emits the light. The optical system 200 causes the image light emitted from the image display element 100 to incident on the light guide member 300.

Thus, the virtual image display device 1000 can reduce the stray light generated by the re-reflection at the first surface 305 and the reflection at the third surface 307 while achieving a wide viewing angle by reducing the minimum value θ1 of the reflection angle θ of the image light with respect to the light emitting part 304. Thus, the virtual image display device 1000 can provide a good image.

The following is described with reference to figures as illustrated below.

Figure 22A:
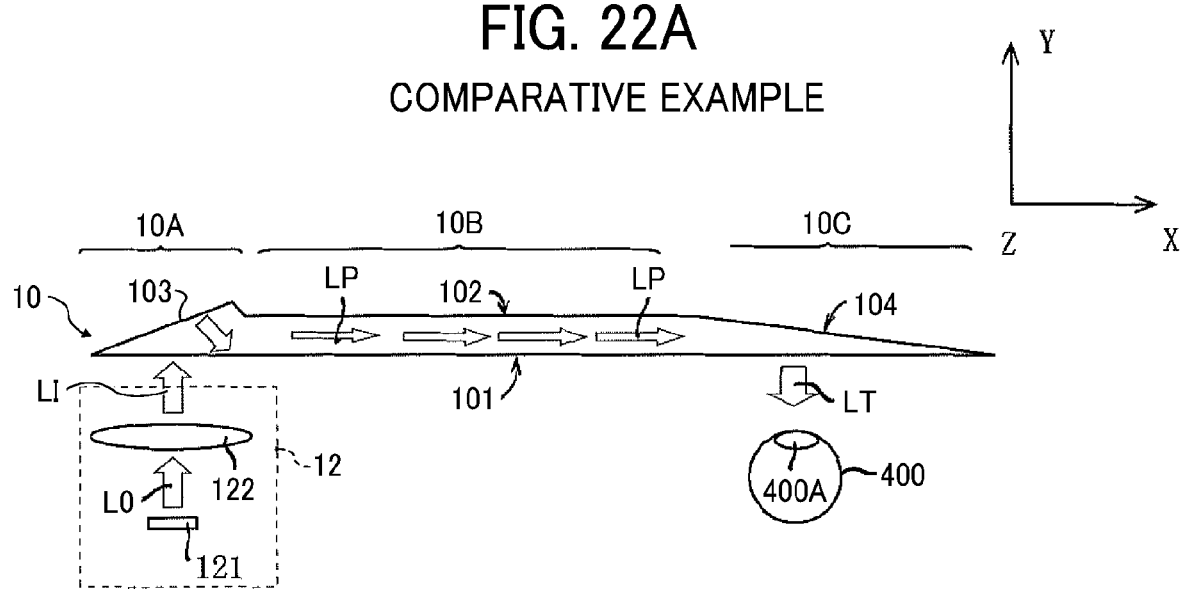
FIGS. 22A to 22C illustrate a comparative example of a virtual image display device.
Figures 1, 22B:
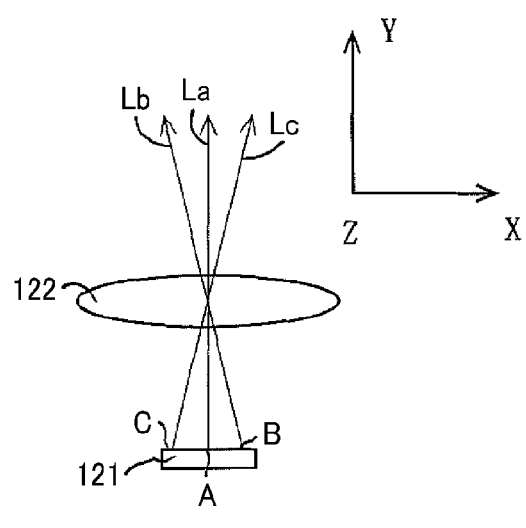
Figures 2, 22B:
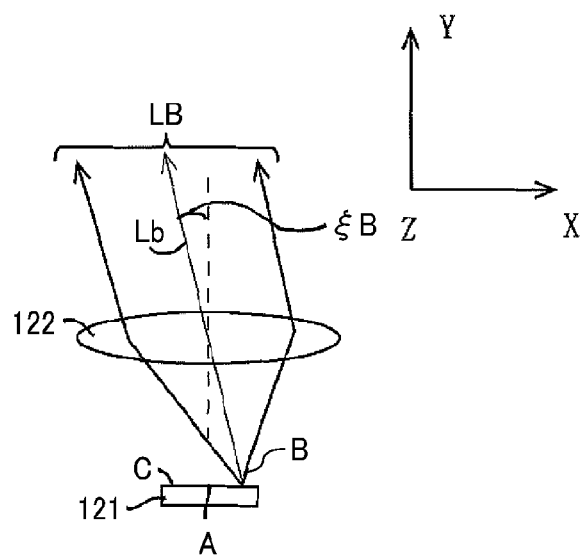
Figure 22C:
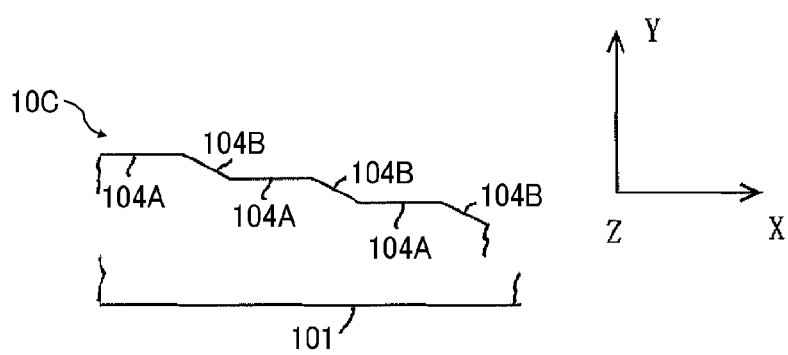

FIGS. 22A to 22C illustrate a comparative example of a virtual image display device using a light guide member. Prior to a description of the light guide member and the virtual image display device of the present embodiment, terms, a mechanism of virtual image display, and the like is described below according to an example illustrated in FIG. 22.

In FIG. 22A illustrate a light guide member 10, an image light generation part 12, and an "observer's eye 400".

As illustrated in FIGS. 22A to 22C, an X direction (horizontal direction in FIGS. 22A to 22C) and a Y direction (vertical direction in FIGS. 22A to 22C) are defined, and a direction orthogonal (normal) to a sheet of the figure is defined as a Z direction.

The image light generation part 12 includes an image display part 121 and a collimator lens 122.

The image display part 121 is, for example, a digital micromirror device (DMD). The DMD includes an image display area in which minute reflection surfaces are arranged in a two-dimensional array as "pixels". The surface of the DMD is irradiated with a laser ray emitted from a semiconductor laser or the like.

An image information generation part tilts the minute reflection surface in the image display area to display an image according to the image to be displayed. A size of the image display area is 3 mm×4 mm as an example, and the number of pixels is approximately 10,000 pixels. The light L0 that is reflection of the image displayed on the image display part 121 is collimated by the collimator lens 122 to become an image light LI.

The light guide member 10 has a "cross-sectional shape as illustrated in the figure in an XY plane". The light guide member 10 has a cross-sectional shape of the figure that continues uniformly in a part that functions as the light guide member in the Z direction.

The light guide member 10 includes three parts, that is, a light incident part 10A, a light guide part 10B, and an image light extraction part 10C.

The image light LI emitted from the image light generation part 12 is taken into the light guide member from the light incident part 10A of the light guide member 10. The image light LI becomes a guided image light LP in the light guide part 10B, and is guided in a "light guide direction", that is, in a right direction in the X axis, and is emitted from the image light extraction part 10C as an observation image light LT. The light guide direction is also referred to as a "guiding direction" of the image light.

When the observation image light LT is incident on the crystalline lens 400A of the observer's eye 400, the image is formed as a two-dimensional image on a retina 400B by image forming action of the crystalline lens 400A so that the observer can observe the two-dimensional enlarged image. An enlarged image observed by the observer is a "virtual image".

The collimator lens 122 and the crystalline lens 400A of the observer's eye 400 (eyeball) form a "relay lens system".

The light guide member 10 is formed of a "transparent optical material such as resin", and a light guiding process of the guided image light LP is performed by "total reflection" in the light guide part 10B and the image light extraction part 10C.

A plane 101 is a "lower surface in the figure" of the light guide part 10B. The plane 101 is parallel to an XZ plane and is a plane common to the light incident part 10A, the light guide part 10B, and the image light extraction part 10C.

The plane 101 forms an "incident surface part of the image light LI" in the light incident part 10A. The plane 101 forms an "emitting surface part of the observation image light LT" in the image light extraction part 10C.

A surface of the light incident part 10A facing the plane 101 is a reflection surface 103 inclined with respect to the X direction. Further, a plane 102 facing the plane 101 is parallel to the plane 101 in the light guide part 10B.

The image light extraction part 10C includes an extraction structure 104 and the plane 101.

The cross-sectional shape of the image light extraction part 10C in the XY plane is "a shape that narrows like a wedge" in the light guide direction.

As illustrated in FIG. 22C, the extraction structure 104 has two types of planes 104A and 104B. The plane 104A is parallel to the plane 101 (that is, also parallel to the plane 102).

The plane 104A "descends stepwise" toward the right end of the figure (FIG. 22C). The plane 104B is inclined to be descend toward the right end of the figure (FIG. 22C) to "connect adjacent planes 104A".

Both the planes 104A and 104B have a "function of reflecting the image light". The plane 104A, together with the plane 101, further guides the image light guided by the light guide part 10B toward the right end of the figure.

The plane 104B reflects a part of the image light incident on the plane 104B toward the plane 101 among the guided image light LP guided by the image light extraction part 10C. A part of the image light reflected in this way is emitted from the plane 101 as the observation image light LT.

As illustrated in FIG. 22B-1, both ends of the image display area of the image display part 121 in the X direction are referred to as end parts B and C, and the central part is referred to as a central part A. It is assumed that the central part A, and the end parts B and C includes an optical axis of the collimator lens 122 and are in a plane parallel to the XY plane.

In this state, the rays passing through the center of the collimator lens 122 are referred to as light rays La, Lb, and Lc among the light rays emitted from the pixels at the central part A, and the end parts B and C. At this time, the light ray La coincides with the optical axis of the collimator lens 122.

FIG. 22B-2 illustrates a state in which the light from the pixel at the end part B is converted into a parallel light flux by the collimator lens 122. Hereinafter, the "light flux converted into the parallel light flux" that is incident on the collimator lens 122 from the pixel at the end part B is referred to as a pixel light flux LB. Regarding the light flux including the light rays La and Lc illustrated in FIG. 22B-1, the light flux converted into the parallel light flux is also referred to as pixel light flux LA or LC.

At this time, angles formed by the light rays La, Lb, and LC indicating optical axis rays of the pixel light flux LA, LB, LC (see FIG. 22B-1) and the optical axis of the collimator lens 122 are referred to as "field angles of the pixel light flux LA, LB, and LC" and is also referred to as field angles $\xi A$, $\xi B$, and $\xi C$ and the like.

The field angle $\xi B$ of the pixel light flux LB is illustrated in FIG. 22B-2.

As is clear from the above description, the image light LI incident on the light incident part 10A of the light guide member 10 is a set of "the pixel light flux that are lights from each pixel constituting the image converted into a parallel light flux" in the image display area of the image display part 121.

Each pixel light flux constituting the image light LI has a field angle corresponding to "a pixel serving as a starting point". The field angle $\xi A$ and the like as described above are examples.

As described above, the light guide member 10 has a uniform "cross-sectional shape in the XY plane" in the Z direction. The optical action on each pixel light flux constituting the image light incident on the light guide member 10 is the same in the XY plane when viewed from the Z direction. Therefore, a plane including the optical axis of the collimator lens 122 among the XY planes is considered in the following description, and the optical action in this plane is considered.

As illustrated in FIG. 22A, the image light LI incident on the light incident part 10A of the light guide member 10 is reflected from the reflection surface 103 to become the guided image light LP, and the light guiding process is performed by total reflection as described above. That is, a light guiding process in the light guide part 10B and the image light extraction part 10C is performed by total reflection by the plane 101 and the plane 102, and the plane 101 and the plane 104A.

Therefore, the incident angle of the guided image light LP (each pixel light flux constituting the guided image light LP) incident on the planes 101 and 102, and the plane 104A is equal to or larger than a critical angle at which total reflection is held.

The critical angle of total reflection in the light guide member 1:γ is provided by γ=sin −1 (1/n) from sin γ=1/n using a refractive index of the transparent optical material constituting the light guide member 1:n.

The field angle of the pixel light flux constituting the image light LI changes between the field angle $\xi B$ and the field angle $\xi C$ according to the position of the pixel. An incident angle of the pixel light flux LB that is incident on the light guide member 10 with the field angle $\xi B$, reflected from the reflection surface 103, and incident on the planes 101, 102 and the plane 104A is the smallest incident angle. Further, an incident angle of the pixel light flux LC that is incident on the light guide member 10 with the field angle $\xi C$, reflected from the reflection surface 103, and incident on the planes 101, 102 and the plane 104A is the largest incident angle.

Therefore, for convenience, the incident angle of the pixel light flux LB that is incident on the planes 101, 102, and the plane 104A is referred to as the "minimum incident angle".

Similarly, the incident angle of the pixel light flux LC that is incident on the planes 101, 102, and the plane 104A is referred to as the "maximum incident angle".

The image light LI is a set of pixel light flux, and each pixel light flux is a parallel light flux having a field angle corresponding to the pixel as a starting point of each pixel light flux.

Therefore, the incident angle incident on the planes 101 and 102 parallel to each other and the plane 104A is determined for each pixel and does not change along a light guiding process when the pixel light flux from each pixel is guided in the light guide member 10.

The above "incident angle" is, of course, equal to the "reflection angle".

In addition to the collimator lens 122, the collimator lens 122 in the above description is simplified for explanation. In reality, the collimator lens 122 includes a plurality of lenses. In the figure (FIG. 22B-1), the light rays La, Lb, and Lc intersect inside the collimator lens 122, but in reality, the light rays La, Lb, and Lc may intersect outside a lens system.

The following problems can be considered in the light guide member of the type described above.

Figure 23A:
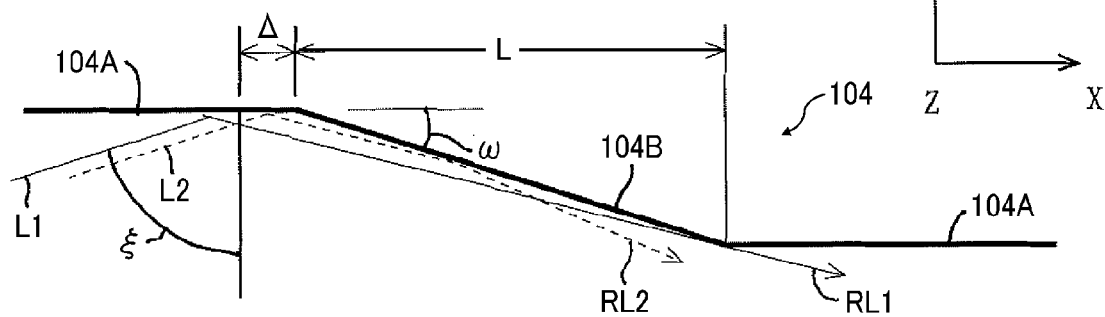
FIGS. 23A to 23C illustrate problems of "stray light and luminance loss" in the light guide member as illustrated in FIG. 22.
Figure 23B:
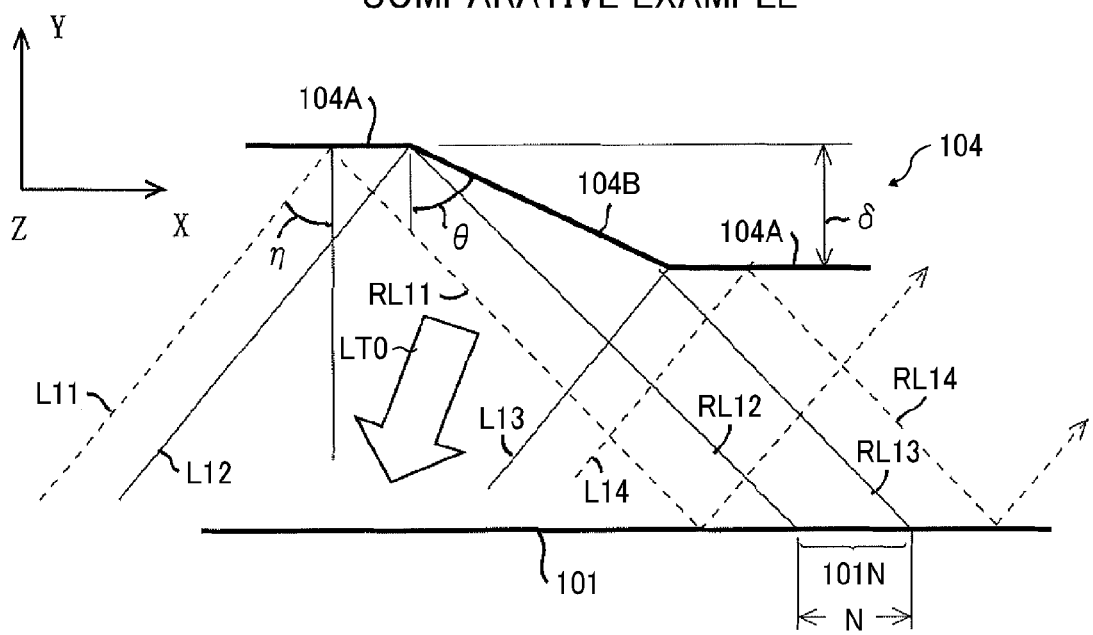
Figure 23C:
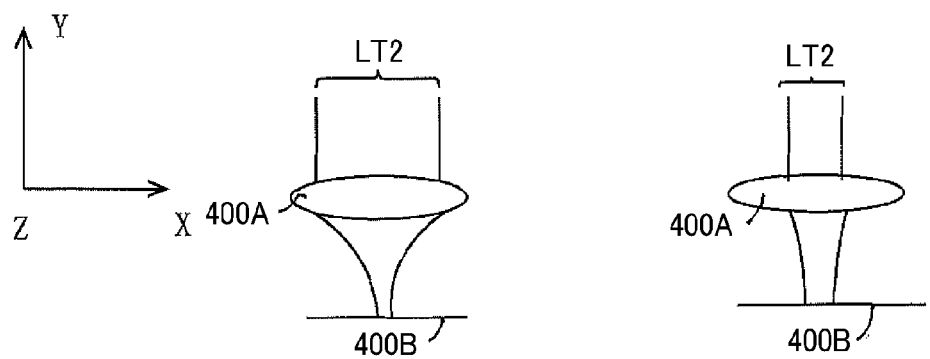

FIGS. 23A to 23C describes the problems in the light guide member.

The first problem is "stray light (flare light)". The first problem is described with reference to FIG. 23A.

FIG. 23A is an enlarged view of a part of the extraction structure 104 as described in FIG. 22C. In this figure (FIG. 23A), it is considered incident light rays L1 and L2 that are incident on the plane 104A with an incident angle (=reflection angle): $\xi$. The incident rays L1 and L2 are two of the light rays constituting the "same pixel light flux" in which the light from the "same pixel" becomes a parallel light flux.

In a connection part between the plane 104A and the plane 104B connected to the plane 104A, a "width: A of minute region" is considered in the plane 104A. The incident ray L1 is incident and reflected from a "left end part in the figure (FIG. 23A)" of the minute region Δ, but a reflected ray RL1 reflected from the left end part is not incident on the plane 104B. However, the incident ray L2 incident on the minute region Δ is reflected from the plane 104A and then incident on and reflected from the plane 104B forming an inclined surface. Thus, the incidence ray L2 becomes stray light RL2 (flare light) other than a normal reflected light.

The stray light RL2 is generated since an angle: ∠R−$\xi$ formed by the ray L2 and the plane 104A is smaller than an inclination angle: ω of the plane 104B. That is, the stray light is generated by a light flux of a light ray, an incident angle: $\xi$ on the plane 104A of which is large. In other words, the stray light is generated by the light flux having an incident angle close to the maximum incident angle.

The width: Δ of the minute region is given by the above-described inclination angle: ω, the incident angle: ξ, and the width: L of the orthogonal projection of the plane 104B on an XZ plane in the X direction as described below.

$$\Delta = L(\tan \omega - \tan(\angle R - \xi))/(\tan(\angle R - \xi).$$

The stray light RL2 becomes a noise component for the observation image light LT (FIG. 22A) as described above. The stray light RL2 deteriorates image quality of the enlarged virtual image to be observed.

A second problem is what is called "luminance loss".

As described above, the light guiding process in the light guide part 10B and the image light extraction part 10C in the light guide member 10 is performed by reflection of the light at the plane 101 and the plane 102, and the plane 101 and the plane 104A.

FIG. 23B illustrates a part of the pixel light flux incident on the plane 104A with an incident angle: η.

The incident rays L11 and L14 are incident on the plane 104A, become reflected rays RL11 and RL14 and incident on and reflected from the plane 101. The reflected rays RL11 and RL14 are further guided to a right direction of the figure (FIG. 23B). The light rays L12 and L13 are incident on and reflected from both ends of the plane 104B to become reflected rays RL12 and RL13 and are further reflected from the plane 101. Then, the reflected rays RL12 and RL13 are further guided to the right direction of the figure (FIG. 23B).

The "pixel light flux part" sandwiched between the rays L12 and L13 is incident on the plane 104B and reflected from the plane 104B to become a reflected light flux LT0. The reflected light flux LT0 is incident on the plane 101, but an incident angle on the plane 101 is equal to or less than the critical angle so that the reflected light flux LT0 is emitted from the plane 101 toward the light guide member. That is, the reflected light flux LT0 becomes "a part of the observation image light LT" and is observed by the observer.

Then, in the region 101N sandwiched between the reflected rays RL12 and RL13 incident on the plane 101, light energy is removed by the reflected light flux LTD, and the light energy becomes zero or "close to zero", that is, the luminance is attenuated in the region 101N.

A state in which the luminance is attenuated as in the region 101N is referred to as "luminance loss".

Since the light guiding process of the pixel light flux in the image light extraction part 10C is performed by repetition of the total reflection between the plane 104A and the plane 101 parallel to each other in the light guide direction. When "luminance loss" occurs in the pixel light flux in the middle of the light guiding process, the pixel light flux in which the luminance loss occurs becomes "a state in which the light flux width is thin".

In the pixel light flux with a thin light flux width, an entire area of the subsequent plane 104B is not irradiated with the light. The pixel light flux with a thin light flux width causes "resolution unevenness or luminance unevenness" of the virtual image observed by the observation image light LT emitted from the image light extraction part 10C.

The width: N of the region 101N, in which the "luminance loss" occurs, is obtained by the flowing equation. In the following equation, the inclination angle "ω" is an inclination angle of the plane 104B as in FIG. 23A, an angle "θ" is an angle formed by a normal line of the plane 104A and the plane 104B in the XY plane, and a distance δ (plane distance) is a distance between adjacent planes 104A in a plane normal-line direction (Y direction) in FIG. 23B.

$$N = \delta(\tan \theta - \tan \eta)$$

Therefore, the width: N of the area, in which the "luminance loss" occurs, becomes larger as the incident angle: η of the "pixel light flux exemplified by the incident rays L11 and L12" incident on the plane 104A becomes smaller. That is, "luminance loss" is likely to occur in a pixel light flux having a small incident angle: η on the plane 104A. Conversely, the width: N becomes 0 when the incident angle: η becomes large, and when η=θ so that the problem of luminance loss is solved. However, the above-mentioned problem of stray light occurs when η>θ.

When a laser ray is used for image formation as in the example in the description, the laser ray is a Gaussian ray, and a focused diameter becomes equal to a "ray waist diameter" when the laser ray is focused by a lens.

As illustrated in a left figure of FIG. 23C, if a width of the light flux LT2 incident on a crystalline lens 400A is sufficiently large, the "ray waist diameter" in the retina 400B becomes small. However, if the width of the light flux LT2 is thin and small as illustrated in a right figure of FIG. 23C, the ray waist diameter in the retina 400B becomes large.

If the widths of the light fluxes constituting the observation image light LT are uneven, "resolution unevenness or luminance unevenness" occurs in the observed enlarged virtual image. Thus, the image quality of the observed enlarged virtual image is deteriorated.

It can be seen that the above-mentioned problems of "stray light" and "luminance loss" occur remarkably when the maximum incident angle: ξ of the image light is larger and the minimum incident angle: η is smaller. In other words, it can be seen that the difference between ξ and η is large, that is, "the larger a range of the incident angle of the image light", the more the stray light and the luminance loss is likely to occur.

Therefore, the problems of deterioration of the image such as flare and luminance unevenness occurs by the problems of "stray light" and "luminance loss" in an "image having a large field angle", that is, the image having a wide (large) incident angle range if the virtual image display device is configured by using such a light guide member.

The light guide member according to the present embodiment is used to reduce or solve the above-mentioned problems of "stray light" and "luminance loss" as described below. Therefore, it is possible to configure a virtual image display device in which flare, uneven luminance, and uneven resolution are unlikely to occur even in an image having a large field angle.

Hereinafter, an embodiment of the light guide member is described below.

Figure 17A:
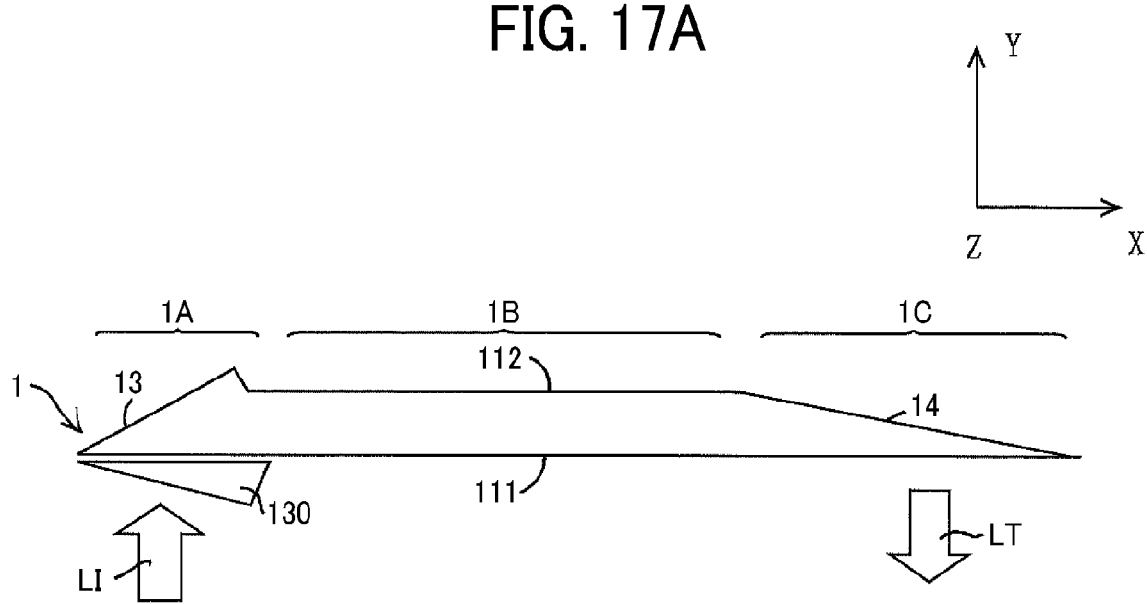
FIGS. 17A to 17C illustrate a characteristic part of the light guide member according to an embodiment of the present disclosure.
Figure 17B:
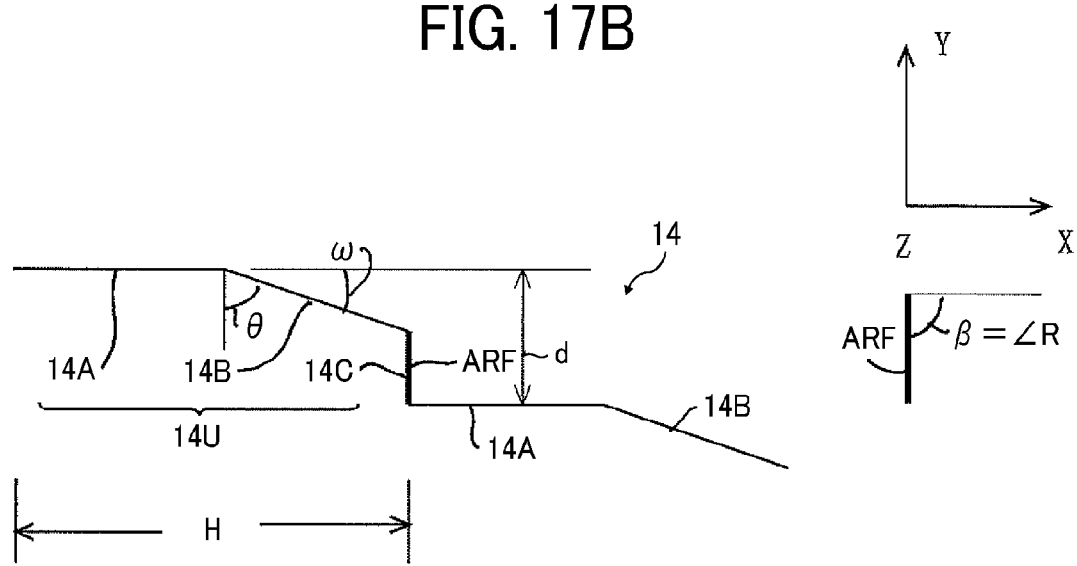
Figure 17C:
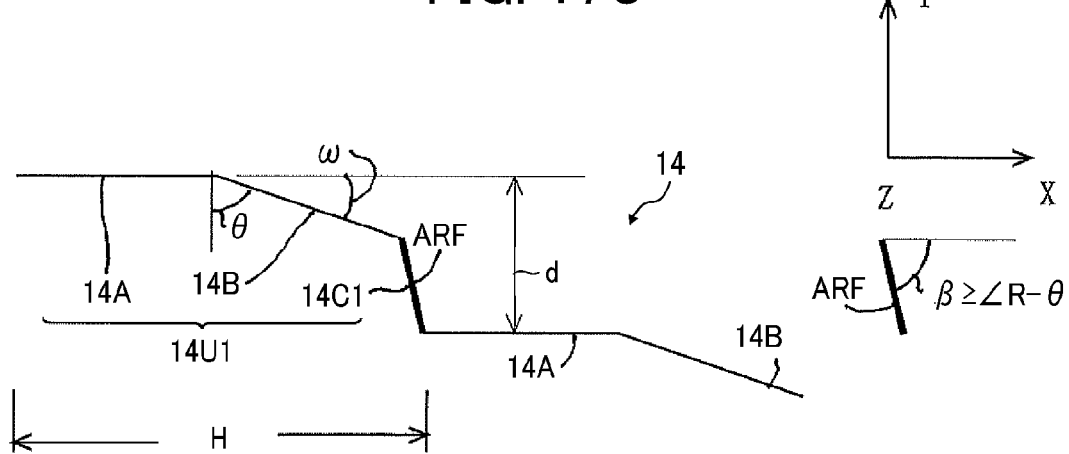

FIGS. 17A to 17C illustrate an example of the light guide member according to an embodiment of the present disclosure.

In FIG. 17A, the light guide member 1 includes a light incident part 1A, a light guide part 1B, and an image light extraction part 1C. As in FIG. 17, the X direction and the Y direction are defined as illustrated in the figures (FIGS. 17A to 17C), and a direction orthogonal (normal) to a sheet of the figure is the Z direction. The "light guide direction" is a direction toward the right end of the X axis.

Figure 20A:
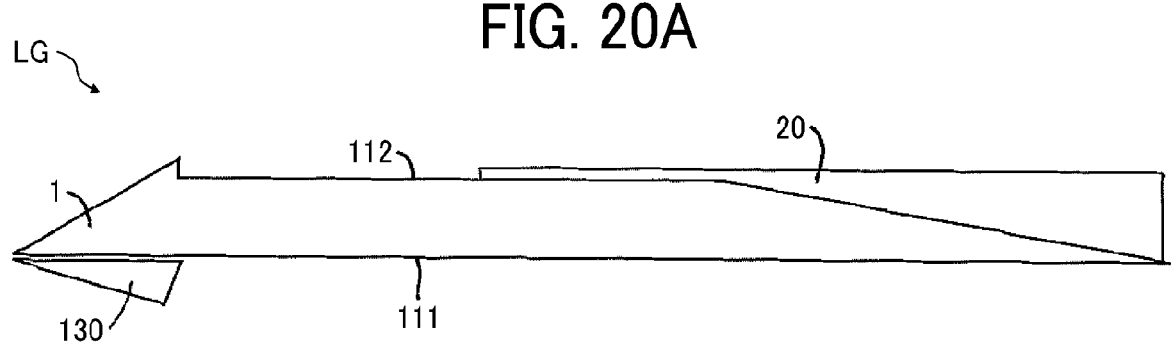
FIGS. 20A to 20C illustrate another embodiment of the light guide member (light guide unit) according to the present disclosure.
Figure 20B:
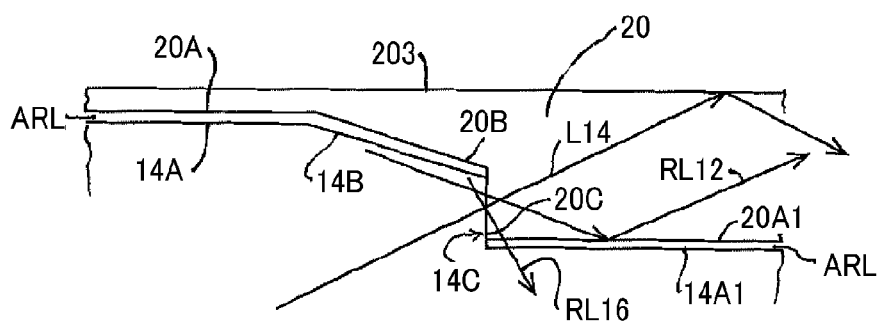
Figure 20C:
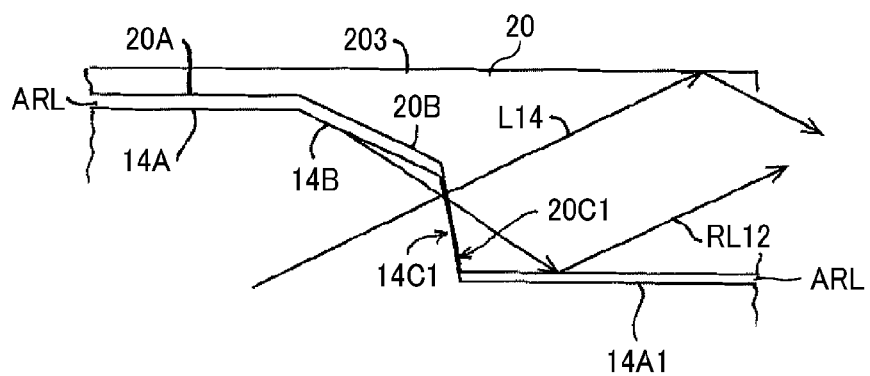

Similar to the light guide member 10 as illustrated in FIGS. 22A to 20C, the light guide member 1 illustrated in FIGS. 17A to 17C is formed of a "transparent optical material such as resin", and the light guiding process in the light guide part 1B and the image light extraction part 1C is performed by "total reflection". The light guide member 1 has a cross-sectional shape as illustrated in the figure (FIG. 17A) in the XY plane. A part that functions as the light guide member has a uniform cross-sectional shape as in the figure in the Z direction. Therefore, as similar to FIGS. 22A to 22C and FIGS. 23A to 23C, the optical action in a plane including a central light ray of the image light LI in the XY plane is considered in the following description.

The light incident part 1A is a part that takes in the image light LI inside the light guide member 1. The light incident part 1A in this embodiment includes a transparent prism 130 on a part on which the image light LI is incident. The transparent prism 130 is used to adjust the incident angle of the image light LI to adjust the reflection angle of the light incident part 1A on the reflection surface 13.

The image light extraction part 1C is a part that reflects the image light LI captured from the light incident part 1A and emits the image light LI outside the light guide member 1 as an observation image light LT.

The light guide part 1B is a part that guides the image light LI from the light incident part 1A toward the image light extraction part 1C.

The light guide part 1B includes a first reflection surface 111 and a second reflection surface 112 that face each other in parallel. The image light LI incident on the light guide member 1 is guided toward the image light extraction part 1C by repeating reflection.

The image light extraction part 1C includes an "emission surface part" and an extraction structure 14. The emission surface part emits the image light LI guided by the light guide part 1B outside the light guide member 1 as an observation image light LT. The extraction structure 14 directs the observation image light LT to be extracted toward the emission surface part.

The "emission surface part" is formed as a "part in which the first reflection surface 111 extends toward the light guide direction (rightward in the figure) of the light guiding process of the light guide part 1B".

The light guide member t according to the present embodiment has a characteristic in a structure of the extraction structure 14.

The extraction structure 14 includes a light-guide reflection surface part, an inclined reflection surface part, and a connection part.

The "connection part" may be a single surface, a composite surface using a plurality of surfaces, or a curved surface. In the following description, an example in which the connection part is formed by a "single surface" is described as an example.

The "connection part formed by a single surface" is referred to as a "connection surface part" in the following description.

Two examples of the extraction structure 14 are illustrated in FIGS. 17B and 17C.

FIGS. 17B and 17C illustrate a "light-guide reflection surface part 14A", a "inclined reflection surface part 14B", and "connection surface parts 14C and 14C1".

In an example illustrated in FIG. 17B, the light-guide reflection surface part 14A, the inclined reflection surface part 14B, and the connection surface part 14C are combined to form a "structural unit 14U having constant width: H" in the X direction. The structural unit 14U is repeatedly formed in the light guide direction.

The light-guide reflection surface part 14A corresponds to the second surface 306 in FIG. 5.

The inclined reflection surface part 14B corresponds to the first surface 305 in FIG. 5. The connection surface parts 14C and 14C1 corresponds to the third surface 307 in FIG. 5.

Similarly, in an example illustrated in FIG. 17C, the light-guide reflection surface part 14A, the inclined reflection surface part 14B, and the connection surface part 14C1 are combined to form a "structural unit 14U1 having a constant width: H" in the X direction. The structural unit 14U1 is repeatedly formed in the light guide direction with a width: H as a cycle.

In adjacent structural units 14U and 14U1, "a plane distance of adjacent light-guide reflection surface parts 14A in the plane normal-line direction" is set to "d" as illustrated in the figures (FIGS. 17B and 17C). That is, the light-guide reflection surface part 14A approaches the first reflection surface 111 by forming a "step" having a distance: d for each one structural unit 14U and 14U1 advancing in the light guide direction.

A distance: d, or "step", is described here as being constant.

That is, the light-guide reflection surface part 14A in each of the structural unit 14U and 14U1 is parallel to the second reflection surface 112. In the adjacent structural units 14U and 14U1, a "distance between the light guide-reflection surface part 14A and the first reflection surface 111" in the structural unit in the light guide direction decreases by a distance: d by a constant step.

That is, the light-guide reflection surface part 14A approaches the first reflection surface 111 by a distance: d for each structural unit in the light guide direction.

The light-guide reflection surface part 14A and the second reflection surface 112 are parallel to each other. The image light LI is also guided by the total reflection between the first reflection surface 111 and the light-guide reflection surface part 14A in the image light extraction part 1C.

The inclined reflection surface part 14B is connected to the light-guide reflection surface part 14A in the light-guide direction in each of the structural unit 14U and 14U1. The inclined reflection surface part 14B is formed to be inclined toward the first reflection surface 111 at an inclination angle: ω.

An angle "θ" is an angle that becomes ∠R−ω with respect to the inclination angle ω. Here, the angle ∠R indicates a right angle (90°). That is, the angle: θ is the angle formed by the normal line of the light-guide reflection surface part 14A and the inclined reflection surface part 14B in the XY plane. Thus, the angle: θ ($\theta_x$) is the same as the angle: θ described with reference to FIG. 23B.

That is, each inclined reflection surface part 14B is inclined toward the first reflection surface 111 with the angle: θ (<∠R) with respect to the normal line of the light-guide reflection surface part 14A.

In the structural units 14U and 14U1, the connection surface parts 14C and 14C1 connect an end part in the light guide direction of the inclined reflection surface part 14B and the "light-guide reflection surface part 14A of the adjacent structural unit in the light guide direction". The connection surface parts 14C and 14C1 and the second reflection surface 112 form an inclination angle: β (β>∠R−θ). The connection surface parts 14C and 14C1 are subjected to "antireflection treatment (ARF)". The inclination angle β is also referred to as "inclination angle $\beta_x$".

The right part of FIGS. 17B and 17C illustrate a relation between the antireflection treatment ARF applied to the same surface with the connection surface parts 14C and 14C1 and the inclination angle: β. In the right part of FIG.

17B, the inclination angle: β is 90 degrees, and in the right part of FIG. 17C, the inclination angle: β is larger than (∠R−θ) degrees. Since the angle: ∠R−θ is equal to the inclination angle: (o, the "inclination angle of the connection surface part 14C1" is larger than the inclination angle of the inclined reflection surface part 14B.

The antireflection treatment ARF can be applied onto the connection surface parts 14C and 14C1 by various methods. For example, an antireflection film may be formed on the connection surface parts 14C and 14C1, or a light absorbing film may be formed on the connection surface parts 14C and 14C1. Further, as described in embodiments as described below, antireflection treatment ARF may be applied by bonding a material as same as the optical material of the light guide member 1 or a material having a refractive index substantially equal to a refractive index of the optical material to the connection surface parts 14C and 14C1 with adhesive or the like.

Thus, the second inclined surface (connection surface parts 14C and 14C1) connects a downstream end of the first inclined surface (inclined reflection surface part 14B) and an upstream end of the opposing surface (light-guide reflection surface part 14A) in the guiding direction (light guide direction). The opposing surface (light-guide reflection surface part 14A) is disposed downstream of the second inclined surface (inclined reflection surface part 14B1) and adjacent to the second inclined surface (inclined reflection surface part 14B1). The second inclined surface (connection surface parts 14C and 14C1) is closer to the boundary surface (first reflection surface 111) than the first inclined surface(inclined reflection surface part 14B), and antireflection treatment is applied to the second inclined surface (connection surface parts 14C and 14C1). Thus, the second inclined surface (connection surface parts 14C and 14C1) has an antireflection treatment.

Further, an angle θx smaller than 90° is formed between a normal line of the opposing surface (light-guide reflection surface part 14A) and the first inclined surface (inclined reflection surface part 14B), and the second inclined surface (connection surface parts 14C and 14C1) and the opposing surface (light-guide reflection surface part 14A) form an angle βx that satisfies a condition of 90°−θx<βx<90°.

An action performed by the extraction structure 14 is described below.

FIGS. 18A to 18D illustrate the extraction structure 14 of a type illustrated in FIG. 17B, that is, the inclination angle: β of the connection surface part 14C of which is ∠R. The X direction, the Y direction, and the Z direction are common to FIGS. 18A to 18D.

An amount related to each part of the extraction structure 14 is described with reference to FIG. 18A.

The light-guide reflection surface part 14A on a left part is referred to as the light-guide reflection surface part 14A in the light guide direction (right direction in the X axis). The light-guide reflection surface part 14 on a right part is referred to as the light-guide reflection surface part 14A1 to distinguish the light-guide reflection surface part 14A1 with the light-guide reflection surface part 14A. The light-guide reflection surface part 14A1 is adjacent to the light-guide reflection surface part 14A in the light guide direction.

The distance (step) between the light-guide reflection surface parts 14A and 14A1 in the Y direction is defined as "d" as described above. The angle "θ" is an angle formed by the normal line of the light-guide reflection surface part 14A and the inclined reflection surface part 14B in the XY plane. Further, a width of the orthogonal projection of the inclined reflection surface part 14B on the XZ plane (a plane parallel to the first reflection surface 111 and the second reflection surface 112) in the light guide direction (X direction) is defined as "G".

Further, a sum of "the width of the orthogonal projection of the connection surface part 14C on the XZ plane in the light guide direction" and the width: G is defined as "W". In an example illustrated in FIG. 18A, the inclination angle: β of the connection surface part 14C is 90 degrees. Thus, a width of orthogonal projection of the connection surface part 14C on the XZ plane in the X direction is 0, and therefore the sum: W=width: G.

Further, the height of the inclined reflection surface part 14B in the Y direction is defined as "d1", and the height of the connection surface part 14C in the Y direction is defined as "d2". Then, "d=d1+d2".

A "distance in the X direction" between an intersection point "p" and a left end of the inclined reflection surface part 14B is "d·tan θ". The intersection point "p" is an intersection between an extension of the inclined reflection surface part 14B and the light-guide reflection surface part 14A1 in the XY plane.

Figure 18A:
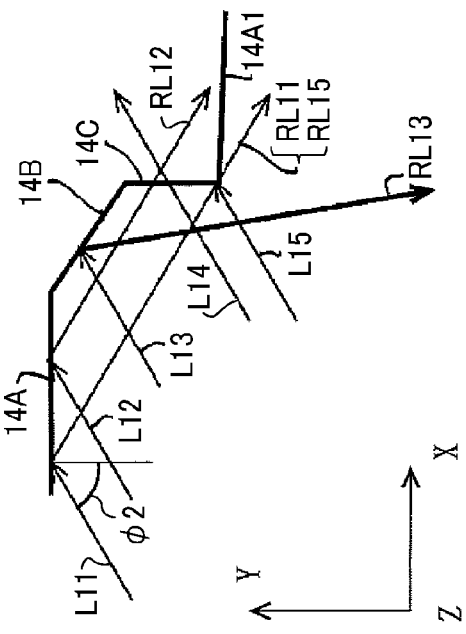
FIGS. 18A to 18D illustrate an example of an extraction structure of the light guide member.

According to the above description with reference to FIG. 18A, the width: G, the sum: W, the distance: d, and the angle: θ of the light guide member of the type illustrated in FIG. 17B satisfy the following relationship.

$$G=W<d\cdot\tan\theta \text{ and } d=d1+d2 \text{ as described above.} \quad (1)$$

Here, the right part of the equation (1) decreases with decrease of the height: d2. In the limit of d2=0, "G=W=d1·tan θ" that corresponds to the case described in FIG. 23B.

Thus, the sum W of a width of an orthogonal projection of the second inclined surface (connection surface part 14C) on the opposing surface (light-guide reflection surface part 14A) and a width G of an orthogonal projection of the first inclined surface (inclined reflection surface part 14B) on the opposing surface (light-guide reflection surface part 14A) satisfies a condition of: W≤d·tan θx, where an angle θx is formed between a normal line of the opposing surface (light-guide reflection surface part 14A) and the first inclined surface (inclined reflection surface part 14B), and a distance "d" is a plane distance between a first opposing surface (light-guide reflection surface part 14A) and a second opposing surface (light-guide reflection surface part 14A1) in a plane normal-line direction.

In the following description, a range of a field angle: A of the image light incident on the second reflection surface 112 is set to: A1≤A≤A2 for convenience in the image light guided by the light guide part 1B of the light guide member 1. Then, in this range of the field angle, it is assumed that the range of the incident angle: θ incident on the second reflection surface 112 is as follows.

$$\phi1\leq\phi\leq\phi2$$

That is, 41 is the "minimum incident angle" and φ2 is the "maximum incident angle".

Figure 18B:
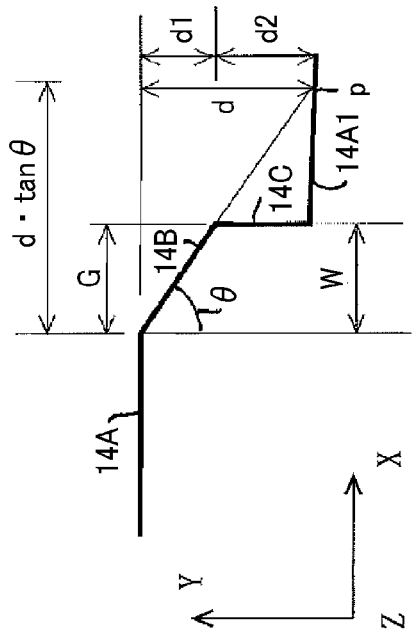

FIG. 18B illustrate incident rays L11 and L12 that are incident on the light-guide reflection surface part 14A and an incident ray L13 that is incident on the inclined reflection surface part 14B.

An incident ray L14 is incident on the connection surface part 14C, and an incident ray L15 is incident on the light-guide reflection surface part 14A1.

It is assumed that the incident rays L11, L12, L13, L14, and L15 are parallel to each other, the field angle of which are A2, and the incident angle of which on the light-guide reflection surface part 14A are "φ2".

Here, the connection surface part 14C is subjected to "antireflection treatment ARF". The antireflection treatment ARF can be applied by various methods. Here, the same material as the optical material of the light guide member 1 is bonded to the connection surface part 14C by adhesive or the like to form the antireflection treatment ARF.

The incident rays L11 and L12 are incident on the light-guide reflection surface part 14A. When the incident rays L11 and L12 are reflected from the light-guide reflection surface part 14A, the incident rays L11 and L12 become reflected rays RL11 and RL12. The reflected ray RL12 is incident on the connection surface part 14C. In FIG. 18B, all the light incident on the light-guide reflection surface part 14A on a right part of the incident light L11 is reflected from the light-guide reflection surface part 14A, and is directly incident on the connection surface part 14C or is reflected from the inclined reflection surface part 14B and then incident on the connection surface part 14C.

Further, the incident ray L13 is incident on the inclined reflection surface part 14B and becomes the reflected ray RL13. The reflected ray RL13 is emitted as "a part of the observation image light LT" from the first reflection surface 111. All the incident rays L11 to L15 are light rays reflected from the first reflection surface 111.

The incident ray L14 is incident on the connection surface part 14C. The incident ray L15 is incident on a connection part between the light-guide reflection surface part 14A1 and the connection surface part 14C (see FIG. 18) and is reflected from the connection part to become the reflected ray RL15.

In FIG. 18B, all the following rays are stray light (flare light), for example, the light ray L14 and the reflected ray RL12 incident on the connection surface part 14C, and the light rays that are incident on and reflected from the light-guide reflection surface part 14A and then reflected from the inclined reflection surface part 14B and incident on the connection surface part 14C. A method of handling the flare lights is described below.

Figure 18C:
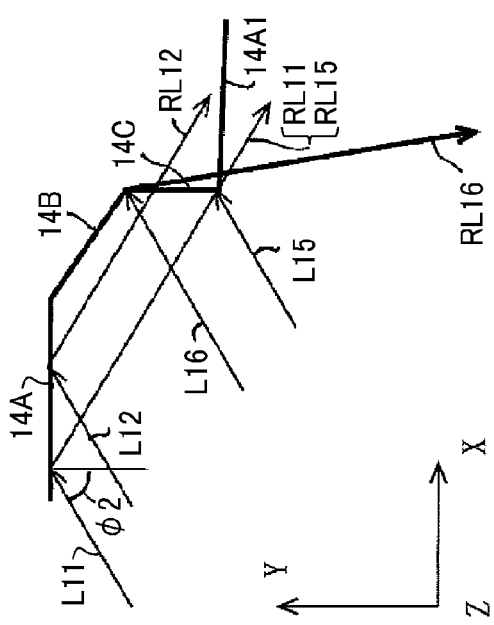

FIG. 18C is a supplement of FIG. 18B. In FIG. 18C, the incident ray L16 incident on a part "adjacent to a boundary between the inclined reflection surface part 14B and the connection surface part 14C" is reflected from the inclined reflection surface part 14B and becomes a reflected ray RL16.

The antireflection treatment ARF is applied on the connection surface part 14C by joining the same material as the optical material of the light guide member 1 to the connection surface part 14C by adhesion or the like. Thus, the connection surface part 14C allows the reflected ray RL16 to pass through the connection surface part 14C without reflecting the reflected ray RL16. Handling of the reflected ray RL16 is described below. However, the reflected ray RL16 does not become a stray light.

Figure 18D:
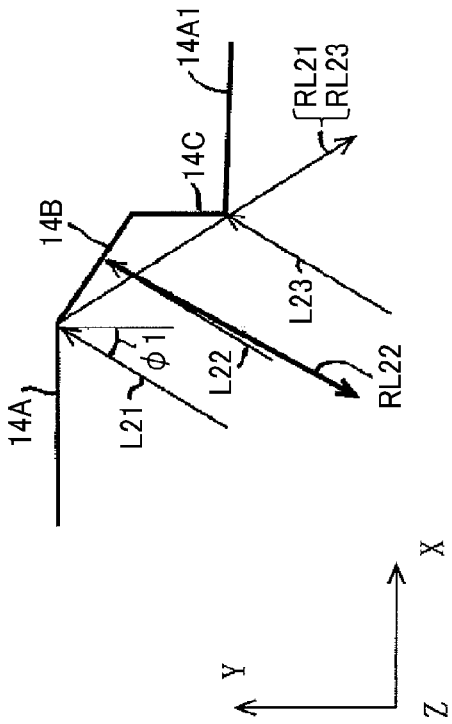

FIG. 18D illustrates an incident rays L21, L22, and L23 among the rays forming a pixel light flux having a field angle A1. The incident ray L21 is incident on the light-guide reflection surface part 14A close to the boundary part with the inclined reflection surface part 14B. The incident ray L22 is incident on the inclined reflection surface part 14B. The incident ray L23 is incident on the light-guide reflection surface part 14A1 close to the boundary part with the inclined reflection surface part 14B.

The incident ray L21 is reflected from the light-guide reflection surface part 14A to become a reflected ray RL21. The incident ray L23 is reflected from the light-guide reflection surface part 14A1 to become a reflected ray RL23.

The incident angle of the incident rays L21 and L23 on the light-guide reflection surface parts 14A and 14A1 is $\phi 1$.

The reflected ray RL23 is emitted as "a part of the observation image light LT" from the first reflection surface 111. In a case of FIG. 18D, "stray light" does not occur.

Considering the "luminance loss", in the case of "field angle: A2 and incident angle: $\phi 2$" as illustrated in FIG. 18B, the reflected ray RL11 and the reflected ray RL15 substantially overlap. Thus, it can be seen that "luminance loss" does not occur for the pixel light flux having the field angle of A2 and the incident angle of $\phi 2$. Since the incident angle is "$\phi 2 > \theta$" for $\phi 2$, as is clear from the figure, $d \cdot \tan \phi 2 > d \tan \theta > G = W$ is satisfied.

In a case in which "field angle: A1 and incident angle: $\phi 1$" as illustrated in FIG. 18D, the reflected ray RL21 and the reflected ray RL23 substantially overlap with each other. It can be seen that "luminance loss" does not occur for the pixel light flux having the field angle of A1 and the incident angle of 41. Since the incident angle: $\phi 1$ is "$\phi 1 < \theta$", it is clear from the figures that a following relation is satisfied.

$$d \tan \theta > d \tan \phi 1 = G = W$$

Therefore, "luminance loss" does not occur for the image light having an incident angle: $\phi$, that satisfies a condition of (in a range of): $\phi 1 \leq \phi \leq \phi 2$. Further, even if "stray light" is generated for a pixel light flux having an incident angle close to the angle: $\phi 2$, the stray light is emitted from the light guide member 1 via the connection surface part 14C. Thus, the problem of stray light can be solved by properly processing this stray light emitted from the light guide member 1 via the connection surface part 14C.

It is considered a case in which the height: d2 of the connection surface part 14C in the Y direction: d2 is reduced in FIG. 18A, a position of the light-guide reflection surface part 14A1 is sifted upward in the Y direction (upward in figure) in FIG. 18D. Therefore, the position at which the incident ray L23 is incident near the end of the light-guide reflection surface part 14A1 is shifted "upward in the figure". Thus, the reflected rays RL21 and RL23 are separated from each other, and "luminance loss" occurs.

The "luminance loss" that occurs in this case can be reduced to a negligible level as a practical problem by adjusting the height: d2.

Conversely, the "light ray part lost as stray light" that directly incident on the connection surface part 14C can be reduced as in the incident ray L14 in FIG. 18B with decrease in the height: d2.

The "light ray part lost as stray light" directly incident on the connection surface part 14C causes a decrease in luminance of the observed enlarged virtual image. The height: d2 is reduced to reduce an amount of such a "light ray part that is directly incident on the connection surface part 14C and lost" to prevent a decrease in the luminance of the enlarged virtual image.

Therefore, the height of the connection surface part 14C: d2 can be appropriately determined by a balance between an occurrence of "luminance loss" and the "brightness of the enlarged virtual image".

Figure 19A:
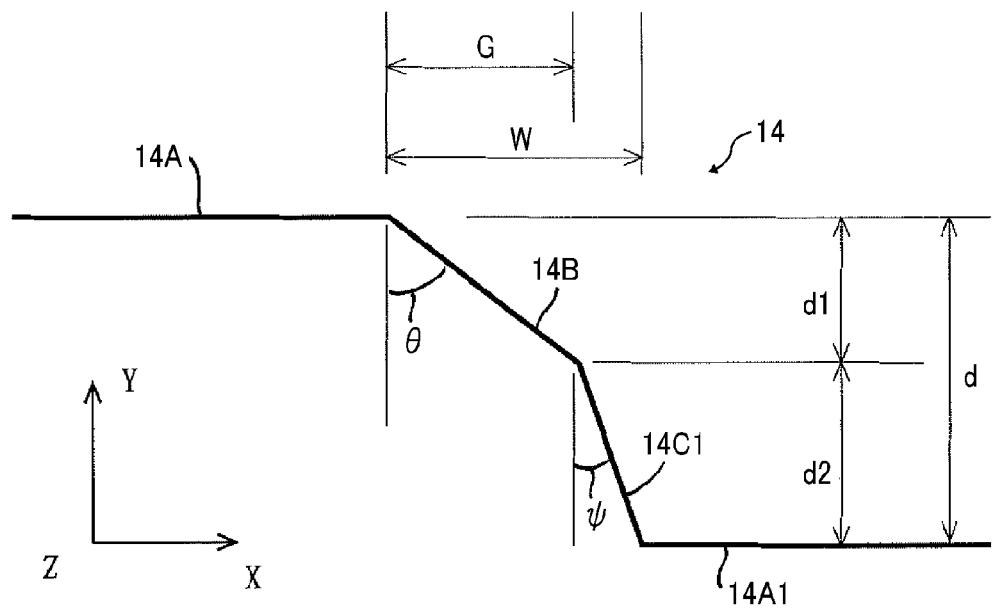
FIGS. 19A and 19B illustrates another example of the extraction structure of the light guide member according to the present embodiment.
Figure 19B:
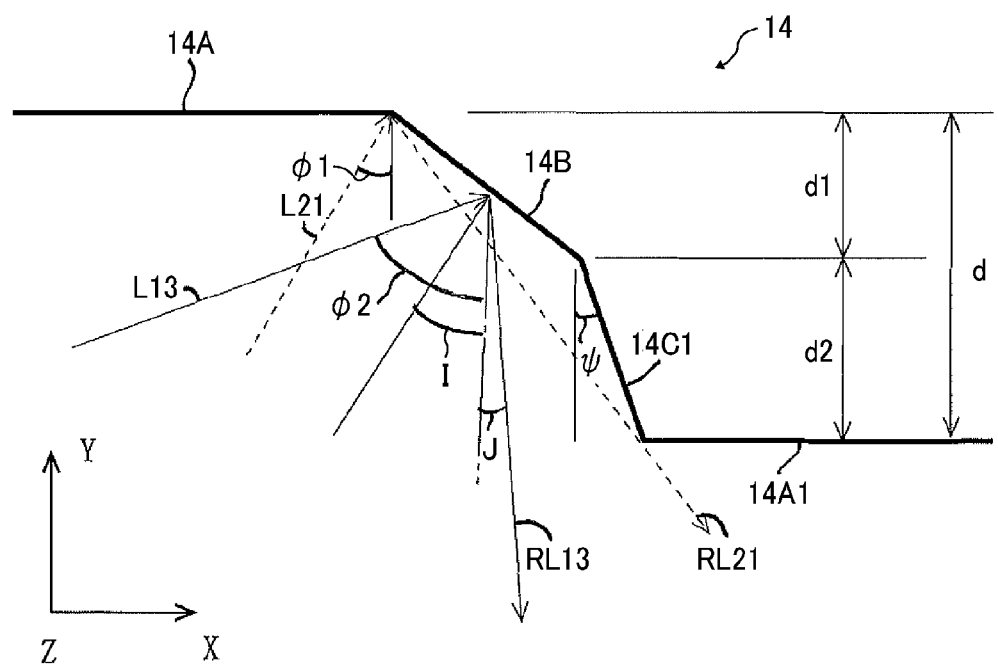

FIGS. 19A and 19B illustrate a case in which described the connection surface part 14C1 has an inclination angle: $\beta$ larger than $\angle R - \theta$ and smaller than 90 degrees, that is, a case as illustrated in FIG. 17C.

As illustrated in FIG. 19A, each part of the extraction structure 14 and the amount related the extraction structure 14 are set as follows according to FIG. 18A.

The light-guide reflection surface part includes the light-guide reflection surface parts 14A and 14A1. The light-guide reflection surface part 14A is on the left part in the light guide direction (X direction). The light-guide reflection surface part 14A1 is on the right part in the light guide direction (X direction) to differentiate with the light-guide reflection surface part 14A. The light-guide reflection surface part 14A1 is adjacent to the light-guide reflection surface part 14A in the light guide direction.

The distance (step) between the light-guide reflection surface parts 14A and 14A1 in the Y direction (plane normal-line direction) is defined as "d". The angle "θ" is an angle formed by the normal line of the light-guide reflection surface part 14A and the inclined reflection surface part 14B in the XY plane. Further, a width of the orthogonal projection of the inclined reflection surface part 14B on the XZ plane (a plane parallel to the first reflection surface 111 and the second reflection surface 112) in the light guide direction (X direction) is defined as "G".

An angle formed by the connection surface part 14C1 in the Y direction (Y axis) is defined as "ψ". Using the "inclination angle: β" described with reference to FIG. 17C, the angle: ψ can be obtained from "∠R−β", that is 90°−β.

Further, a sum of "a width of the orthogonal projection of the connection surface part 14C on the XZ plane in the light guide direction" and the width: G is defined as "W". Since the connection surface part 14C1 has an angle: ψ in the Y direction, the width of the orthogonal projection of the connection surface part 14C1 onto the XZ surface in the X direction is not 0, and the sum: W>width: G.

Further, the height of the inclined reflection surface part 14B in the Y direction is defined as "d1", and the height of the connection surface part 14C in the Y direction is defined as "d2". "d=d1+d2".

As described with reference to FIG. 18A, the width: G, the sum: W, the distance (step): d, and the angle: θ as described above of the light guide member 1 of the type illustrated in FIG. 17C satisfy the following relationship.

$$G < W < d \cdot \tan \theta \quad (1)$$

Similar to the case described with reference to FIG. 18, a range of the field angle: A of the image light incident on the second reflection surface 112 is set to A1≤A≤A2 in the image light guided by the light guide part 1B of the light guide member 1. In this range of field angle, it is assumed that the range of the incident angle: φ incident on the second reflection surface 112 is as follows.

$$\phi 1 \leq \phi \leq \phi 2$$

In FIG. 19B, an incident ray L13 is incident on the inclined reflection surface part 14B at an incident angle: φ2.

A reflected ray RL13 is a light ray that is the incident ray L13 reflected from the inclined reflection surface part 14B.

The angle formed by the reflected ray RL13 in the Y direction (Y axis) is defined as an angle: J.

Also, the angle: I in the figure (FIG. 19B) is equal to the angle: θ.

Angle: J is {(φ2−θ)−θ}, that is, φ2−2θ.

If the angle: J=φ2−2θ is smaller than the angle ψ formed by the connection surface part 14C1 and the Y direction, a reflected ray (parallel to the reflected ray RL13) does not incident on the connection surface part 14C1 even the incident ray L13 having the incident angle: φ2 is incident on and reflected from the part near the boundary between the inclined reflection surface part 14B and the connection surface part 14C1".

Further, in FIG. 19B, an incident ray L21 is incident on the vicinity of the boundary between the light-guide reflection surface part 14A and the inclined reflection surface part 14B with an incident angle: φ1.

When the incident ray L21 is reflected from the boundary, the incident ray L21 becomes a reflected ray RL21. Thus, in a configuration as illustrated in the figure (FIG. 19B), the "luminance loss" does not occur in the pixel light flux having an incident angle of φ1.

To prevent occurrence of such "luminance loss", the width: G, the sum: W, the incident angle: φ1, the angles: θ and ψ may satisfy the following conditions.

According to an illustration in FIG. 19A, first, the width: G is obtained by G=d1·tan θ.

From this, the height: d1 becomes d1=G/tan θ.

Further, the height: d2 is obtained from W−G=d2·tan ψ using the angle: ψ.

From this, the height: d2 becomes d2=(W−G)/tan ψ.

Further, the height: d=d1+d2 is given by d=W/tan φ1 using the sum: W and the incident angle: φ1.

Since d=d1+d2, W/tan φ1=G/tan θ+(W−G)/tan ψ.

If this equation is solved for the sum: W, then W=G·tan φ1 (tan ψ·tan θ)/tan θ(tan ψ−tan φ1).

That is, if the inclined reflection surface part 14B, the connection surface part 14C1, the incident angle: φ1 and φ2 satisfy the conditions of: (4) ψ>φ2−2θ and (5) W=G·tan φ1 (tan ψ−tan θ)/(tan θ(tan ψ−tan φ1)), then the reflected ray incident on and reflected from the inclined reflection surface part 14B at an incident angle: φ1 does not incident on the connection surface part 14C1. Thus, the "luminance loss" does not occur in the reflected light flux of the image light having a range of field angle of A1≤A≤A2.

Even if the above conditions (4) and (5) are not strictly satisfied, it is possible to approximately satisfies the above conditions to provide an "extraction structure" that does not have a problem in practice.

Thus, the second inclined surface (connection surface parts 14C and 14C1) and the opposing surface (light-guide reflection surface part 14A) form an angle βx, the second inclined surface (connection surface parts 14C and 14C1) and a normal line of the boundary surface (first reflection surface 111) forms an angle ψ obtained by 90°−βx, an incident angle φ of the image light incident on the opposing surface (light-guide reflection surface part 14A) satisfies a condition of (is in a range of) φ1≤4≤φ2, where φ1 is a minimum incident angle smaller than the angle θx and φ2 is a maximum incident angle larger than the angle θx, and the sum W satisfies a condition of: ψ>φ2−2θx and W=G·tan φ1 (tan ψ−tan θx)/(tan θx (tan ψ−tan φ1)).

In the case of the embodiment illustrated in FIG. 19 as described above, following two examples are preferable examples of values of the sum: W, the width; G, the distance (step): d, the angle: θ, and the incident angle: φ1 and φ2.

"Example 1": W=0.175 mm, G=0.174 mm, d=0.196 mm, θ=63°, φ1=42.11°, and φ2=66.4°.

"Example 2": W=0.213 mm, G=0.179 mm, φ1=42.10, φ2=66.4°, θ=63°, and ψ=12.4°.

Since W≈G in "Example 1", this example is an embodiment of the case illustrated in FIG. 18 (in the case of FIG. 17B).

Further, "Example 2" is an example of the case illustrated in FIG. 19 (in the case of FIG. 17C).

Hereinafter, another embodiment of the light guide member 1 and a process of stray light (flare light) in this embodiment is described below.

FIG. 20A illustrates an example of a configuration of this embodiment.

That is, a light guide member LG of this embodiment includes a transparent member 20 (transparent part) combined together with the light guide member 1 as described above as a single body. The light guide member 1 and the transparent member 20 combined together as a single body is one example of an "embodiment of the light guide member". In order to avoid confusion, the embodiment of the light guide member as illustrated in FIG. 20A is referred to as the "light guide unit LG" below. Since the transparent member 20 constitutes a part of the light guide member LG, the transparent member 20 is also referred to as a "transparent part".

The transparent member 20 is made of the same optical material as the light guide member 1 or "an optical material having a refractive index substantially equal to a refractive index of the light guide member 1" and is "plate-shaped". The transparent member 20 is provided in a part of the second reflection surface 112 of the light guide member 1. A surface 203 (see FIG. 20B) of the transparent member 20 is separated from the second reflection surface 112. The surface 203 is a flat surface and is parallel to the first reflection surface 111 and the second reflection surface 112.

The transparent member 20 is disposed on the second reflection surface 112 of the light guide member 1 as follows.

That is, the transparent member 20 is adjacent to the second reflection surface 112, the light-guide reflection surface part 14A, and the inclined reflection surface part 14B with an air gap.

The transparent member 20 is joined to the connection surface part 14C to form "antireflection treatment process on the connection surface part".

The example in FIG. 20B illustrates a case in which the connection surface part of 104C of the "extraction structure" of the light guide member 1 is the connection surface part 14C having an inclination angle: $\beta = \angle R$ as illustrated in FIG. 17B. The connection surface part 14C is joined to a side surface 20C of the transparent member 20.

An example in FIG. 20C illustrates the connection surface part 14C1 having the inclination angle: $\beta$ ($\geq R-\theta$) illustrated in FIG. 17C. The connection surface part 14C1 is joined to the surface 20C1 of the transparent member 20.

The connection surface part 14C1 is joined to the surface 20C1 using an adhesive material such as a UV effect resin, for example. The light guide member 1, the transparent member 20, and the adhesive material have an "almost equivalent" refractive index. Fresnel reflection at a joint part of the light guide member 1, the transparent member 20, and the adhesive material is almost zero.

An "air layer ARL" is interposed between the transparent member 20 and the second reflection surface 112, between the transparent member 20 and the light-guide reflection surface part 14A (14A1), and between the transparent member 20 and the inclined reflection surface part 14B.

In FIGS. 20B and 20C, the surface 20A of the transparent member 20 is adjacent to the light-guide reflection surface part 14A of the light guide member 1 via the air layer ARL. Similarly, the surface 20B is adjacent to the inclined reflection surface part 14B via the air layer ARL.

In FIG. 20B, the light ray L14 is directly incident on the connection surface part 14C from the light guide member 1, and the reflected ray RL12 is reflected from the inclined reflection surface part 14B and is incident on the connection surface part 14C. Further, the reflected ray RL16 that is reflected from the inclined reflection surface part 14B at a "vicinity of the boundary part between the inclined reflection surface part 14B and the connection surface part 14C" as described with reference to FIG. 18C is incident on the transparent member 20 from the connection surface part 14C.

First, regarding the reflected ray RL16, the reflected ray RL16 is incident on the surface 20A1 of the transparent member 20 adjacent to the light-guide reflection surface part 14A1 of the light guide member 1. However, since the incident angle of the reflected ray RL16 is smaller than the critical angle, the reflected ray RL16 is not reflected from the surface 20A1 and is emitted from the transparent member 20. Then, the reflected ray RL16 is incident on the light-guide reflection surface part 14A1 of the light guide member 1, passes through the light guide member 1 as it is, and is emitted from the light guide member 1 as a part of the observation image light. Therefore, the reflected ray RL16 does not become "stray light" as described above.

Conversely, the light ray L14 and the reflected ray RL12 are totally reflected from the surface 20A1 of the transparent member 20 adjacent to the light-guide reflection surface part 14A1 of the light guide member 1 via the air layer ARL and are totally reflected from the surface 203 facing the surface 20A1. The light ray L14 and the reflected ray RL12 are guided rightward in FIG. 20B in the transparent member 20 and is emitted outside the transparent member 20 or is absorbed by an absorber provided at an end of the transparent member 20 in the light guide direction.

In the example illustrated in FIG. 20C, a light ray such as the reflected ray RL16 in FIG. 20B does not exist since the connection surface part 14C1 has the angle: $\psi$ that satisfies the above-mentioned condition (4).

The light ray L14 and the reflected ray RL12 similar to the light ray L14 and the reflected ray RL12 as illustrated in FIG. 20B are incident on the connection surface part 14C1. The light ray L14 and the reflected ray RL12 are guided by the total reflection in the transparent member 20 and is emitted outside the transparent member 20 or absorbed by the absorber provided at the end of the transparent member 20 as described above.

Figure 21A:
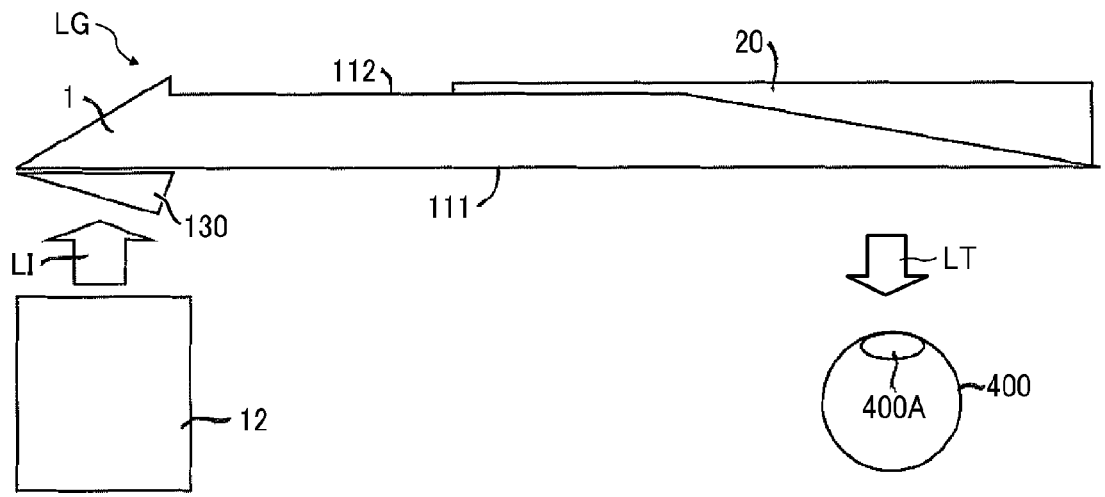
FIGS. 21A to 21C illustrate one embodiment of the virtual image display device using a light guide member (light guide unit) in FIG. 20A to 20C.
Figure 21B:
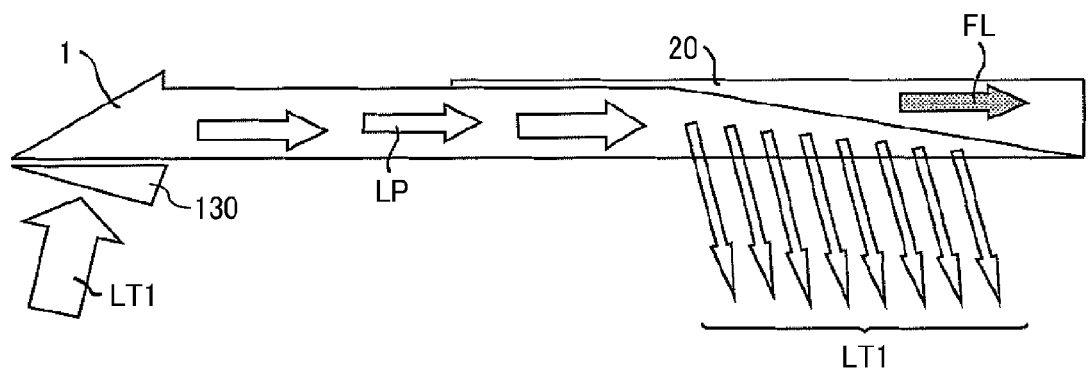
Figure 21C:
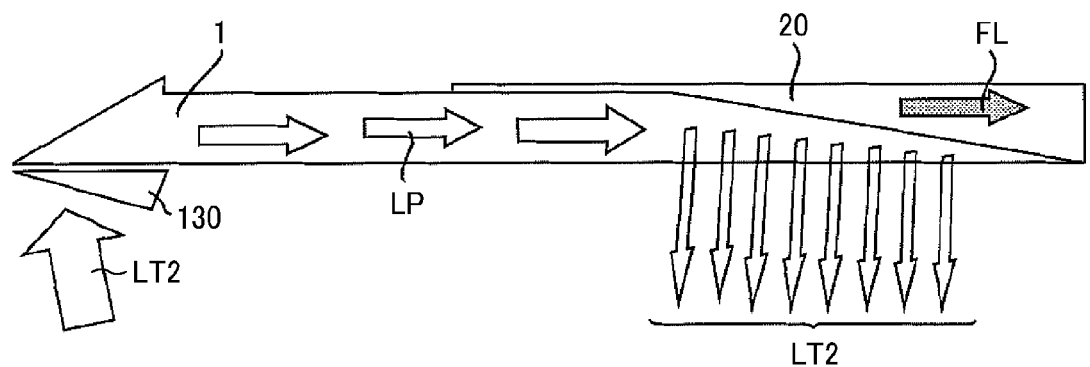

FIGS. 21A to 21C illustrate an embodiment of a virtual image display device using the light guide member LG (light guide unit) described with reference to FIG. 20 and FIGS. 22A to 22C. In order to avoid complication, the reference numerals that are unlikely to be confused are designated by the same reference numerals as in FIG. 22.

As illustrated in FIG. 21A, the image light LI from the image light generation part 12 is taken into the light guide member 1 from the prism 130 of a light incident part of the light guide member 1 of the light guide unit LG. The image light LI is guided in the light guide part of the light guide member 1, extracted from the image light extraction part as an observation image light LT traction unit, and imaged on a retina 400B by action of the crystalline lens 400A of the observer's eye 400 (see FIG. 23C).

In FIG. 21B, the pixel light flux LI1 incident on the light-guide reflection surface part at the minimum incident angle: $\phi 1$ is guided by the light guide member 1 as the light-guide image light LP. The light-guide image light LP is emitted from the light guide member 1 as the observation image light LT1. The stray light FL is guided and processed by the transparent member 20.

FIG. 21B illustrates a state in which the pixel luminous flux LI2 incident on the light-guide reflection surface part at a maximum incident angle: $\phi 2$ is guided by the light guide member 1 as light-guide image light LP and emitted as an observation image light LT2, and the stray light FL is guided by the transparent member 20 to be processed.

A range in which the observation image light LT including the observation image lights LT1 and LT2 is extracted is referred to as the "eye box".

Thus, the transparent member 20 joined to the second inclined surface (connection surface part 14C), the transparent member 20 configured to form a part of the light guide member LG, and the transparent member 20 having a refractive index identical to another part of the light guide member 1.

The embodiment of the light guide member and the virtual image display device of the present embodiment are described above.

As described above, the light guide member according to the present embodiment can reduce or prevent a generation of stray light and can effectively reduce or prevent the "luminance loss".

Therefore, the virtual image display device 1000 using the light guide members 1 and 300 according to the present embodiment can effectively reduce or eliminate "deterioration of image quality due to stray light" or "uneven resolution and uneven luminance of the enlarged virtual image due to luminance loss" in an observed "enlarged virtual image".

Embodiments of the present disclosure are not limited to the embodiments described above. For example, above examples describe that the optical material identical to the optical material of the light guide member 1 or "an optical material having a refractive index substantially equal to a refractive index of the light guide member 1" is joined to connection surface part 14C with adhesive to prevent occurrence of "Fresnel reflection" at the boundary surface of the above.

The antireflection treatment ARF is not limited to such an example. For example, a "light absorber such as a light absorbing film" may be formed on the connection surface part 14C to absorb all the light ray incident on the connection surface part 14C to prevent the generation of stray light. The above case does not need a transparent member that guides and removes stray light.

Since it is sufficient to eliminate reflection of light at the connection part to prevent the stray light, the antireflection member is provided on the connection part to prevent the generation of the stray light.

Further, the light-guide reflection surface part 14A and the inclined reflection surface part 14B of the extraction structure 14 can be used as mirror surfaces. For example, the incident ray L22 illustrated in FIG. 18D has a small incident angle on the inclined reflection surface part 14B, so that the reflectance of the reflected ray RL22 is small and the luminance of the observation image light is reduced.

In such a case, the light-guide reflection surface part 14A and the inclined reflection surface part 14B of the extraction structure 14 preferably have half mirror surfaces. Even if the light-guide reflection surface part 14A and the inclined reflection surface part 14B of the extraction structure 14 are made of half mirror, the light-guide reflection surface part 14A and the inclined reflection surface part 14B have see-through property as the light guide member 1.

Further, the second reflection surface 112 configuring the light guide part may also be made of a half mirror.

Further, when the light guide member 1 is a "non-transmissive type", the entire extraction structure 14 including the second reflection surface 112 can also have a mirror surface.

Further, in the example described above in accordance with FIGS. 17A to 17C, the light-guide reflection surface part 14A, the inclined reflection surface part 14B, and the connection surface part 14C are combined to form a "structural unit 14U having a constant width: H" in the X direction. The structural unit 14U is repeatedly formed in the light guide direction with a period of H.

Further, the adjacent structural units 14U and 14U1 have the constant distance (step): d that is "the plane distance of adjacent light-guide reflection surface parts 14A in the plane normal-line direction".

The above description is an example of a configuration of the extraction structure, and the configuration of the extraction structure is not limited to the embodiment as described above.

Figure 24:
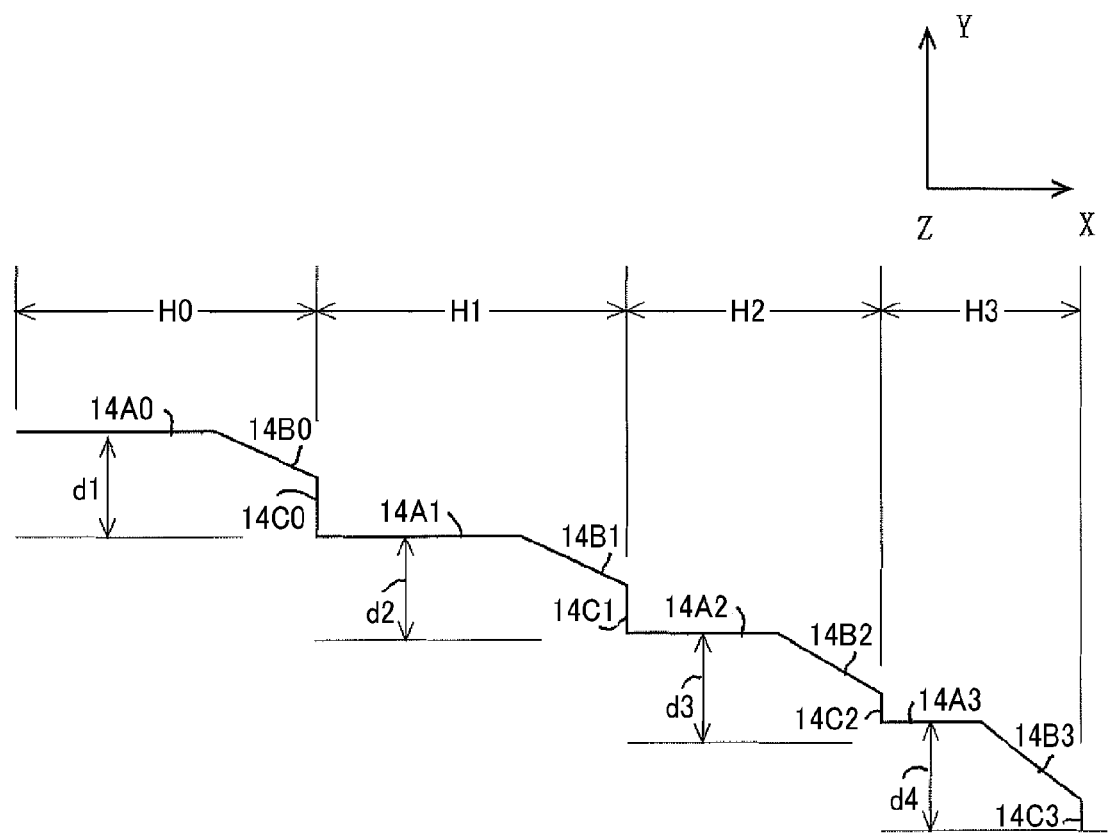
FIG. 24 illustrates a configuration of the extraction structure of the light guide member.

Referring to FIG. 24, a width: Hi (i=0 to 3) of the structural units 14U in the X direction are not identical and different with each other in an example illustrated in FIG. 24. Each of the structural unit 14U includes the light-guide reflection surface parts 14Ai (i=0 to 3), the inclined reflection surface parts 14Bi (i=0 to 3), and the connection surface parts 14Ci (i=0 to 3).

Similarly, the distances (steps): di (i=0 to 3) are the "plane distance of adjacent light-guide reflection surface parts 14Ai (i=0 to 3) in the plane normal-line direction". The distances (steps): di are not identical and are different from each other.

The light guide member according to the present embodiment includes "individual structural units each of which includes the light-guide reflection surface part 14Ai (i=0 to 3), the inclined reflection surface part 14Bi (i=0 to 3), and the connection surface part 14Ci (i=0 to 3)" having a predetermined configuration to solve or reduce the problems of "stray light and luminance loss". Therefore, the width: H and the distance (step): d that characterize each structural unit of the extraction structural are not necessarily "same for each structural unit".

For example, the light-guide reflection surface part 14A may be configured to have "the width: H in the X direction decreasing for each structural unit 14U" toward the light guiding direction (rightward in the X direction in FIG. 17 or the like).

Since a light quantity of the light-guide image light LP guided by the image light extraction part "decreases with increase in a light guide distance". Thus, "an optimum width: H and an optimum distance: d" may be designed for each structural unit 14U according to the light quantity of the guided light so that the width: H and the distance: d decrease rightward in the X direction in FIGS. 17A to 17C.

The virtual image display device 1000 according to the present embodiment as described above can be implemented as a head mount display (HMD) of a spectacle type or the like.

The above embodiments describe a case in which the first reflection surface 111 is formed as "a part extending toward the light guide direction (rightward in the figure) in the light guiding process of the light guide part 1B". The first reflection surface 111 serves as the "emission surface part". The emission surface part and the first reflection surface 111 do not have to be "identical surface" and may have "steps" with each other as long as the emission surface part and the first reflection surface 111 are parallel to each other.

Although the preferred embodiment of the present disclosure is described above, the present embodiment is not limited to the specific embodiment described above. Unless otherwise limited in the above description, various modifications and changes are possible within the scope of the invention described in the claims.

The effects described in the embodiments of the present disclosure are listed as examples of most preferable effects derived from the present disclosure, and therefore are not limited to the effects described above.

Above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

This patent application is based on and claims priority to Japanese Patent Application No. 2020-124168, filed on Jul. 21, 2020, in the Japan Patent Office, and Japanese Patent Application No. 2020-127360, filed on Jul. 28, 2020, in the Japan Patent Office the entire disclosure of which are hereby incorporated by reference herein.

REFERENCE SIGNS LIST

100 . . . Virtual image display device
200 Optical system
201 Light propagating at an angle $\theta1$ having the smallest reflection angle $\theta$ with respect to a light emitting part
202 Light propagating at an angle $\theta2$ having the largest reflection with respect to the light emitting part
300 Light guide member
301 Light incident part
302 Light guide part
303 Image extraction part
304 Llight emitting part (boundary surface)
305 First surface (first inclined surface)
306 Second surface (opposing surface)
307 Third surface(second inclined surface)
308 Upper surface of light guide part
309 Lower surface of light guide part
310 Parallel plane member
311 One end of parallel plane member
312 Another end of parallel plane member
350 Mirror
401 Reflection coating
402 Coating having reflection and transmission characteristics
403 Coating having reflection and transmission characteristics
404 Adhesive layer)

The invention claimed is:

1. A light guide comprising:
a boundary surface configured to reflect image light guided to the boundary surface and emit the image light outside the light guide;
an opposing surface parallel to the boundary surface, the opposing surface facing the boundary surface;
a first inclined surface having an inclination in which a distance between the first inclined surface and the boundary surface decreases in a guiding direction of the image light; and
a second inclined surface between the opposing surface and the first inclined surface, the second inclined surface inclined at a different angle with the first inclined surface in the guiding direction,
wherein:
the second inclined surface connects a downstream end of the first inclined surface and an upstream end of the opposing surface in the guiding direction,
the opposing surface is downstream of the second inclined surface and adjacent to the second inclined surface,
the second inclined surface is closer to the boundary surface than the first inclined surface, and
the second inclined surface has an antireflection treatment.

2. The light guide according to claim 1, wherein the second inclined surface is upstream of the first inclined surface in the guiding direction,
a distance between the second inclined surface and the boundary surface increases in the guiding direction, and
an angle α of the second inclined surface with respect to the boundary surface satisfies a condition of $\alpha \geq 90° - \theta1$,
where $\theta1$ is a minimum value of a reflection angle $\theta$ of the image light with respect to the boundary surface.

3. The light guide according to claim 2,
wherein a length X1 of the second inclined surface satisfies a condition of:

$X1 > 1(|\tan(\gamma)| - |\tan(\beta)|)/(|\tan(\alpha)| + |\tan(\beta)|) \cdot |\cos(\gamma)/\cos(\alpha)|$, where $\gamma$ is an angle of the first inclined surface with respect to the boundary surface, $\beta = 90° - \theta2$, $\theta2$ is a maximum value of the reflection angle $\theta$ of the image light with respect to the boundary surface, and 1 is a length of the first inclined surface.

4. The light guide according to claim 3,
wherein the first inclined surface includes a region having a distance X2,
the image light guided through the light guide is not incident on the region in the first inclined surface,
the distance X2 is defined by $\xi = \alpha + \theta - 90°$, $\eta = \alpha + \gamma - \xi$, and $X2 = X1 (\sin(\xi)/\sin(\eta))$,
the distance X2 is a distance between a first intersection P1 and a third intersection P3,
wherein the first intersection P1 is an intersection of the first inclined surface and the second inclined surface,
a second intersection P2 is an intersection of the second inclined surface and the opposing surface, and
the third intersection P3 is an intersection of the first inclined surface and the image light that passes an area adjacent to the second intersection P2 and is incident on the first inclined surface at the minimum value $\theta1$ of the reflection angle $\theta$.

5. The light guide according to claim 2,
wherein the opposing surface includes multiple opposing surfaces;
the first inclined surface includes multiple first inclined surfaces; and
the second inclined surface includes multiple second inclined surfaces, and
multiple sets each including one of the multiple opposing surfaces, one of the multiple first inclined surfaces, and one of the multiple second inclined surfaces are repeatedly disposed in the guiding direction, and
a distance between the multiple opposing surfaces and the boundary surface gradually decreases in the guiding direction.

6. The light guide according to claim 5,
wherein the multiple opposing surfaces have different lengths from each other.

7. The light guide according to claim 2, further comprising a reflection coating on the first inclined surface.

8. The light guide according to claim 2, further comprising a coating having reflection and transmission characteristics on the first inclined surface, the opposing surface, and the second inclined surface.

9. A display comprising:
an image display element configured to emit image light;
the light guide according to claim 1 to guide the image light emitted from the image display element and emit the image light outside the light guide; and an optical system to collimate the image light emitted from the image display element and emit the image light to the light guide.

10. The light guide according to claim 1,
wherein the first inclined surface and a normal line of the opposing surface form an angle $\theta_x$ that is smaller than 90°, and
the second inclined surface and the opposing surface form an angle $\beta_x$ that satisfies a condition of $90°-\theta_x<\beta_x<90°$.

11. The light guide according to claim 1,
wherein the opposing surface includes a first opposing surface and a second opposing surface, the second opposing surface disposed downstream of the first opposing surface in the guiding direction,
the first inclined surface and the second inclined surface connect the first opposing surface and the second opposing surface, and
a sum W of a width of an orthogonal projection of the second inclined surface on the opposing surface and a width G of an orthogonal projection of the first inclined surface on the opposing surface satisfies a condition of:

$$W \leq d \cdot \tan \theta_x,$$

where an angle $\theta_x$ is formed between a normal line of the opposing surface and the first inclined surface, and a distance "d" is a plane distance between the first opposing surface and the second opposing surface in a plane normal-line direction.

12. The light guide according to claim 11,
wherein the width G is equal to or smaller than the sum W.

13. The light guide according to claim 11,
wherein an incident angle $\phi$ of the image light incident on the opposing surface satisfies a condition of $\phi 1 \leq \phi \leq \phi 2$,
where $\phi 1$ is a minimum incident angle smaller than the angle $\theta_x$ and $\phi 2$ is a maximum incident angle larger than the angle $\theta_x$, and
the sum W, the distance d, and the minimum incident angle $\phi 1$ satisfy a condition of:

$$W \leq d \cdot \tan \phi 1.$$

14. The light guide according to claim 11,
wherein the second inclined surface and the opposing surface form an angle $\beta_x$,
the second inclined surface and a normal line of the boundary surface form an angle $\psi$ obtained by $90°-\beta_x$,
an incident angle $\phi$ of the image light incident on the opposing surface satisfies a condition of $\phi 1 \leq \phi \leq \phi 2$,
where $\phi 1$ is a minimum incident angle smaller than the angle $\theta_x$ and $\phi 2$ is a maximum incident angle larger than the angle $\theta_x$, and
the sum W satisfies a condition of: $\psi > \phi 2 - 2\theta_x$ and $W = G \cdot \tan \phi 1 (\tan \psi - \tan \theta_x)/(\tan \theta_x (\tan \psi - \tan \phi 1))$.

15. The light guide according to claim 1,
wherein the antireflection treatment of the second inclined surface is an antireflection member configured to prevent reflection of the image light or a light absorber configured to absorb the image light.

16. The light guide according to claim 1,
wherein the light guide comprises a transparent body,
the image light is guided through the light guide by total reflection between the boundary surface and the opposing surface.

17. The light guide according to claim 1,
wherein the light guide includes a transparent part on the second inclined surface, the transparent part having a refractive index identical to that of another part of the light guide,
wherein the transparent part is adjacent to the opposing surface and the first inclined surface with an air gap, and
the transparent part is configured to prevent reflection of the image light at the second inclined surface.

18. The light guide according to claim 17,
wherein the transparent part comprises a transparent member joined to the second inclined surface with an adhesive.

19. The light guide according to claim 1,
wherein at least one of the boundary surface and the opposing surface has a parallel plane joined with a joint,
wherein the joint includes a coating having reflection and transmission characteristics.

* * * * *